US010510172B2

(12) United States Patent
Gibb et al.

(10) Patent No.: US 10,510,172 B2
(45) Date of Patent: Dec. 17, 2019

(54) AUTOMATED COMBINATION OF MULTIPLE DATA VISUALIZATIONS

(71) Applicant: Domo, Inc., American Fork, UT (US)

(72) Inventors: Gary Gibb, Lindon, UT (US); Alan Winters, Lindon, UT (US); Mardell Cheney, Highland, UT (US); Ben Green, Murray, UT (US); Chris Willis, Heber City, UT (US)

(73) Assignee: Domo, Inc., American Fork, UT (US)

( * ) Notice: Subject to any disclaimer, the term of this patent is extended or adjusted under 35 U.S.C. 154(b) by 0 days.

(21) Appl. No.: 15/786,517

(22) Filed: Oct. 17, 2017

(65) Prior Publication Data

US 2018/0040154 A1  Feb. 8, 2018

Related U.S. Application Data

(63) Continuation of application No. 14/030,400, filed on Sep. 18, 2013, now Pat. No. 9,818,211.

(60) Provisional application No. 61/816,087, filed on Apr. 25, 2013.

(51) Int. Cl.
*G06T 11/20* (2006.01)
*G06T 11/60* (2006.01)

(52) U.S. Cl.
CPC ......... *G06T 11/60* (2013.01); *G06T 11/206* (2013.01)

(58) Field of Classification Search
None
See application file for complete search history.

(56) References Cited

U.S. PATENT DOCUMENTS

| 2012/0017165 A1* | 1/2012 | Gardner | ............ G06F 17/30899 715/771 |
| 2014/0152667 A1* | 6/2014 | Li | ............................. G06T 1/00 345/440 |

* cited by examiner

*Primary Examiner* — Ke Xiao
*Assistant Examiner* — Jed-Justin Imperial
(74) *Attorney, Agent, or Firm* — Patent Law Works LLP

(57) ABSTRACT

A visualization combination engine may be used to combine a first data visualization based on a first data set with a second data visualization based on a second data set. The combination process may be initiated by, for example, clicking and dragging the first data visualization onto the second data visualization. The visualization combination engine may create the combined data visualization without requiring the user to manually combine the first and second data sets. The combination may be carried out by identifying a key that is common between the two data sets and combining the first and second data sets into a combined data set based on the key, and then creating the combined data visualization based on the combined data set. One or more cues may be used during the process to provide helpful information and/or allow user selection of the properties of the combined data visualization.

21 Claims, 18 Drawing Sheets
(2 of 18 Drawing Sheet(s) Filed in Color)

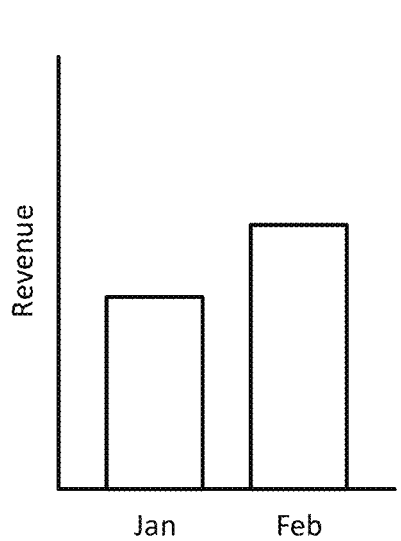
Chart 1
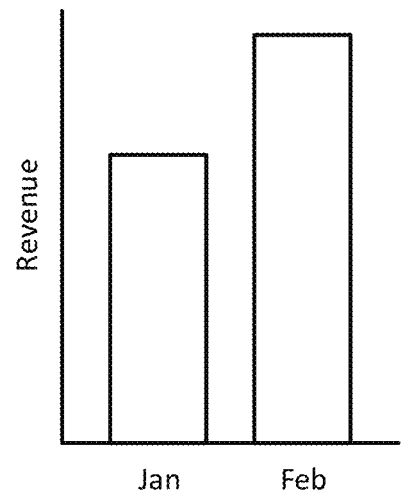
Chart 2
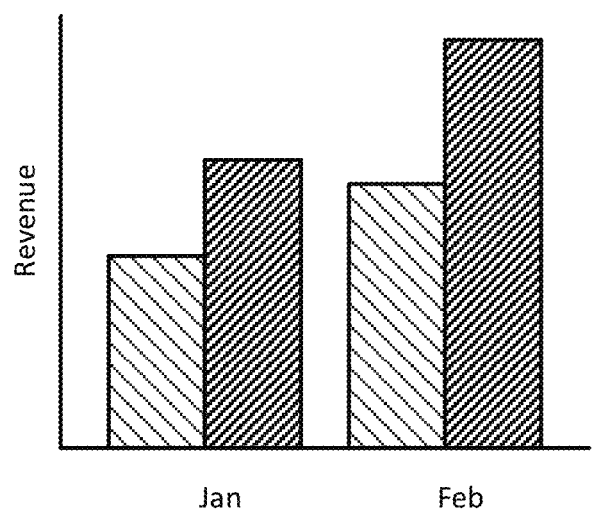
Combined Chart
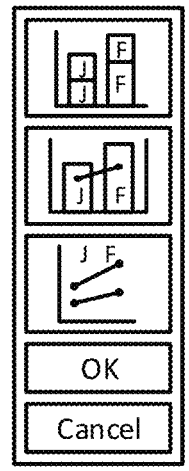
*FIG. 6*

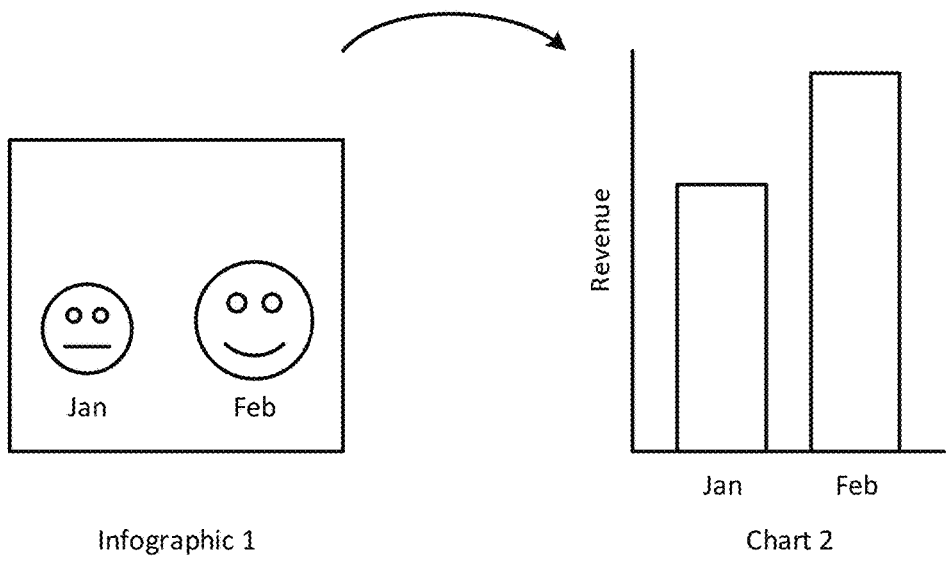
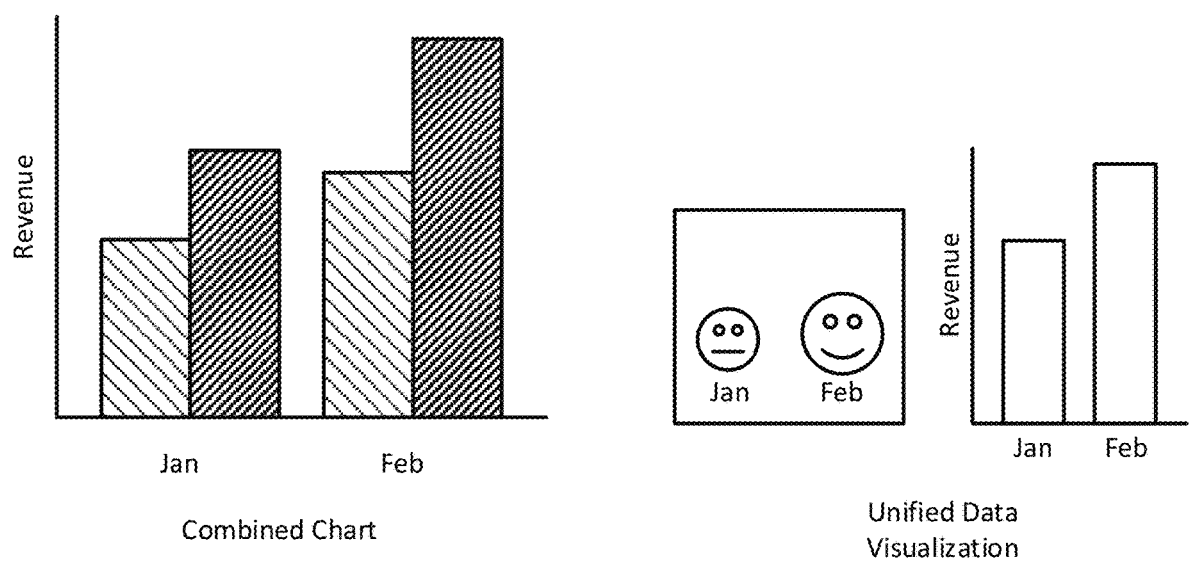
*FIG. 13*

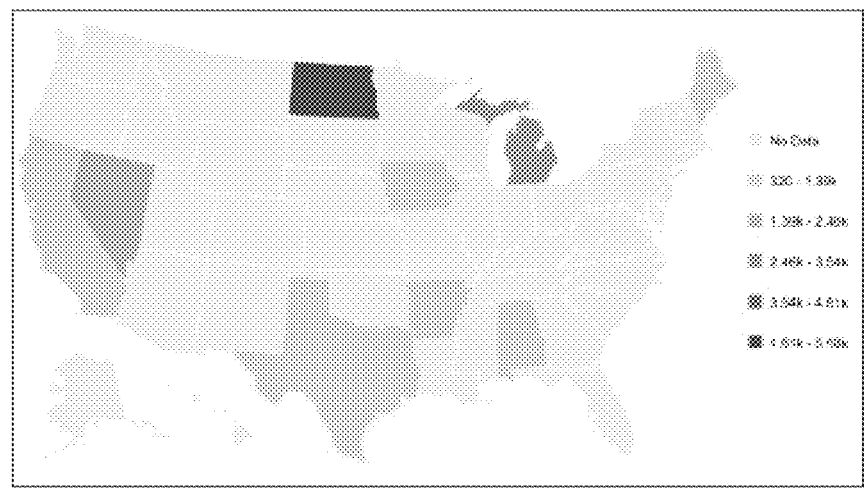
Map 1
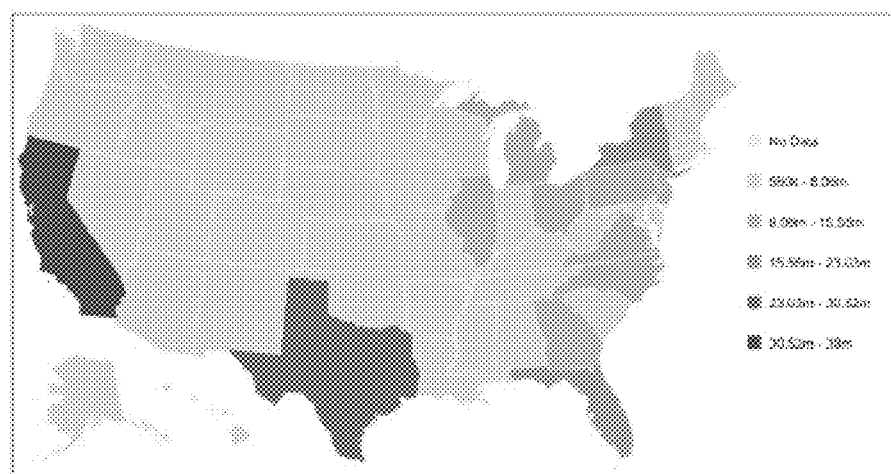
Map 2
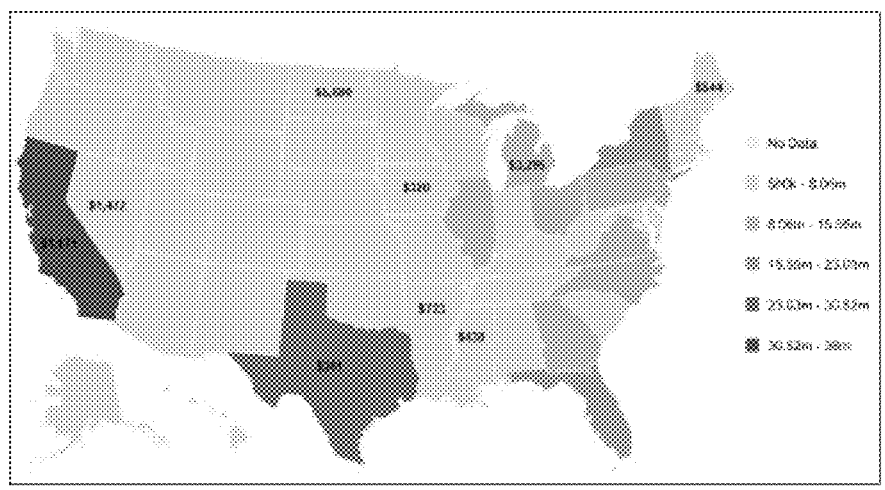
*FIG. 14*  Combined Map

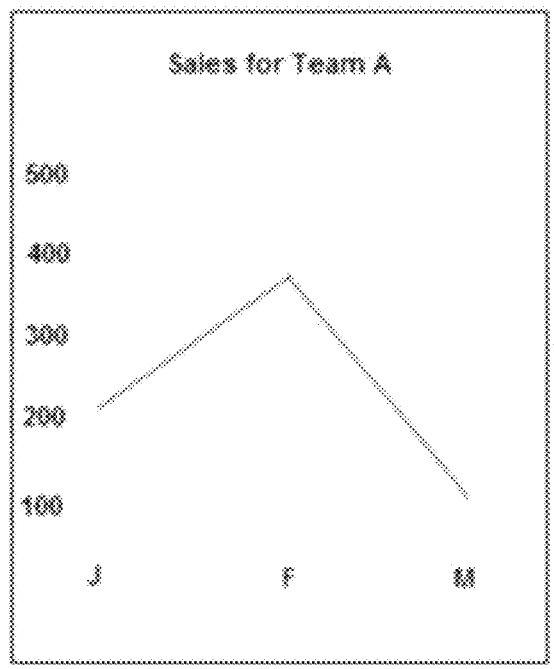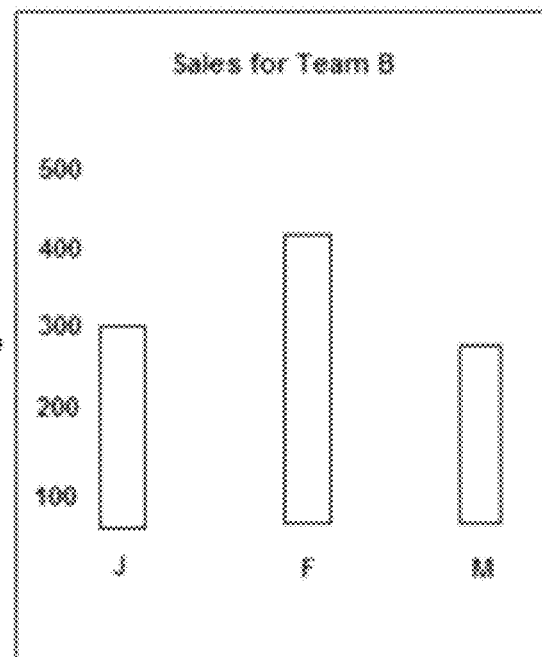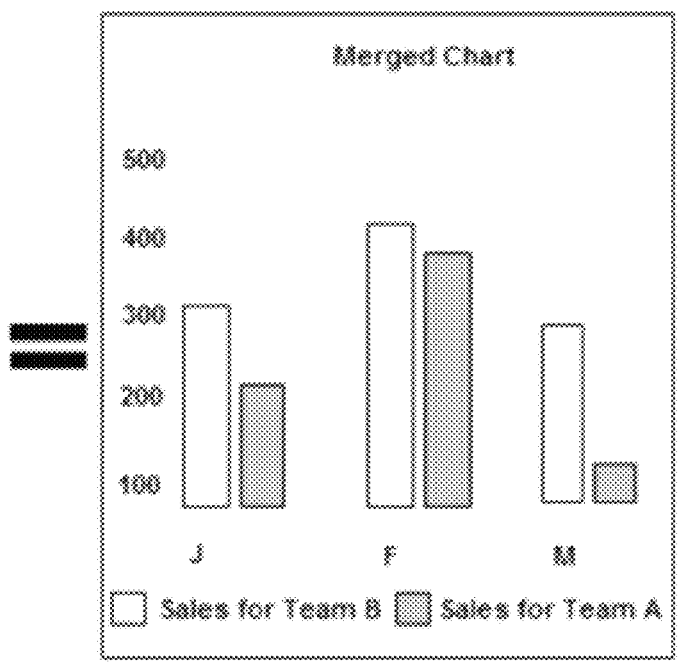
FIG. 17

AUTOMATED COMBINATION OF MULTIPLE DATA VISUALIZATIONS

CROSS-REFERENCE TO RELATED APPLICATION

The present application is a continuation of U.S. patent application Ser. No. 14/030,400, entitled "Automated Combination of Multiple Data Visualizations," filed Sep. 18, 2013, which claims priority from U.S. Provisional Application Ser. No. 61/816,087, entitled "Combining Multiple Charts and Data Sets," filed Apr. 25, 2013, each of which is incorporated by reference herein in their entirety.

FIELD OF THE INVENTION

The present invention relates to systems and methods for automatically combining data visualizations such as charts, graphs, infographics, and maps.

DESCRIPTION OF THE RELATED ART

Data visualizations include all ways of graphically representing numerical data, including charts, graphs, infographics, and maps. Data visualizations are widely used to rapidly and concisely convey relationships between and among the various data in a data set. For example, in the context of business management, a data set may include sales revenue broken down by month. Analyzing the raw data may be cumbersome, but a graph of sales revenue over time can rapidly convey comparative performance, sales trends over time, and other useful information to a user such as a business executive.

It is often useful, in business intelligence systems and in other contexts where data visualizations are presented, to combine two or more data visualizations into a single visualization. Conventionally, many existing systems require data sources to be combined before a visualization using the combined data set can be generated or displayed. Creating combined data sets can require both technical and/or business knowledge of the data. Additionally, combination of the data sets may be time-consuming. These realities may preclude many users from attempting to make the combination.

Furthermore, it may be difficult and/or time-consuming for the user to properly format the combined data set for viewing. It is helpful for a combined visualization to present the data from multiple data sets in a manner that permits easy comparison and correlation of corresponding data.

Yet further, combining data sets may entail a process of trial and error in which the user may or may not see success. Even if the combination is successful, the resulting combined visualization may have less value than expected. Accordingly, time spent manually combining data sets may be wasted.

SUMMARY

As set forth above, manually combining multiple data sets can be time-consuming, tedious, and technical. The systems and methods of the present invention address such difficulty by providing mechanisms for automatically combining multiple data sets to yield a combined data visualization that conveys data from the included data sets. This may be accomplished without requiring users to know about the data source structure. Meaningful visualizations for analysis may be generated from the combined data visualizations in an intuitive and easy-to-use manner.

In at least one embodiment, the system of the present invention allows users to combine a first visualization and a second visualization into a single combined visualization by dragging the first visualization on top of the second visualization, and/or by performing some other input operation. Advantageously, the user may not need to manually combine the data sets for the first and second visualizations.

In at least one embodiment, the data sets are combined automatically based on a common identifier or key. Cues or other user input prompts may be used to modify the type, format, and/or scope of the combined visualization. If the first and second visualizations cannot be combined into a single combined visualization, they may instead be displayed next to each other.

The present invention may be applied to many different types of visualizations including but not limited to charts, graphs, infographics, and maps. Where appropriate, a legend identifying the data illustrated in the combined visualization may be automatically generated and/or presented in combination with the combined visualization.

Further details and variations are described herein.

BRIEF DESCRIPTION OF THE DRAWINGS

The patent or application file contains at least one drawing executed in color. Copies of this patent or patent application publication with color drawings will be provided by the Office upon request and payment of the necessary fee.

The accompanying drawings illustrate several embodiments of the invention. Together with the description, they serve to explain the principles of the invention according to the embodiments. One skilled in the art will recognize that the particular embodiments illustrated in the drawings are merely exemplary, and are not intended to limit the scope of the present invention.

FIG. 6 is a block diagram depicting the combination of two data visualizations according to one example of the invention.

FIG. 13 is a block diagram depicting the combination of two data visualizations according to another example of the invention.

FIG. 14 is a block diagram depicting the combination of two data visualizations according to another example of the invention.

FIG. 17 is a block diagram depicting the combination of two data visualizations according to another example of the invention.

DETAILED DESCRIPTION OF THE EMBODIMENTS

For illustrative purposes, the methods described and depicted herein refer to automated combination of data visualizations selected by the user of a computing system. The data visualizations may, in some embodiments, relate to the operation of an enterprise. The user may select two or more data visualizations to be combined, and may optionally select the type and/or format of the combined data visualization to be created. A data visualization combination engine may initiate creation of the combined data visualization without the need for the user to manually combine the data sets on which the selected data visualizations are based. One skilled in the art will recognize that the techniques of the present invention can be applied to many different types of data visualizations, and may apply to many different situations apart from the exemplary enterprise operation context mentioned previously.

System Architecture

According to various embodiments, the present invention can be implemented on any electronic device equipped to receive, store, and present information. Such an electronic device may be, for example, a desktop computer, laptop computer, smartphone, tablet computer, or the like.

Although the invention is described herein in connection with an implementation in a computer, one skilled in the art will recognize that the techniques of the present invention can be implemented in other contexts, and indeed in any suitable device capable of receiving and/or processing user input. Accordingly, the following description is intended to illustrate various embodiments of the invention by way of example, rather than to limit the scope of the claimed invention.

Figure 1A:
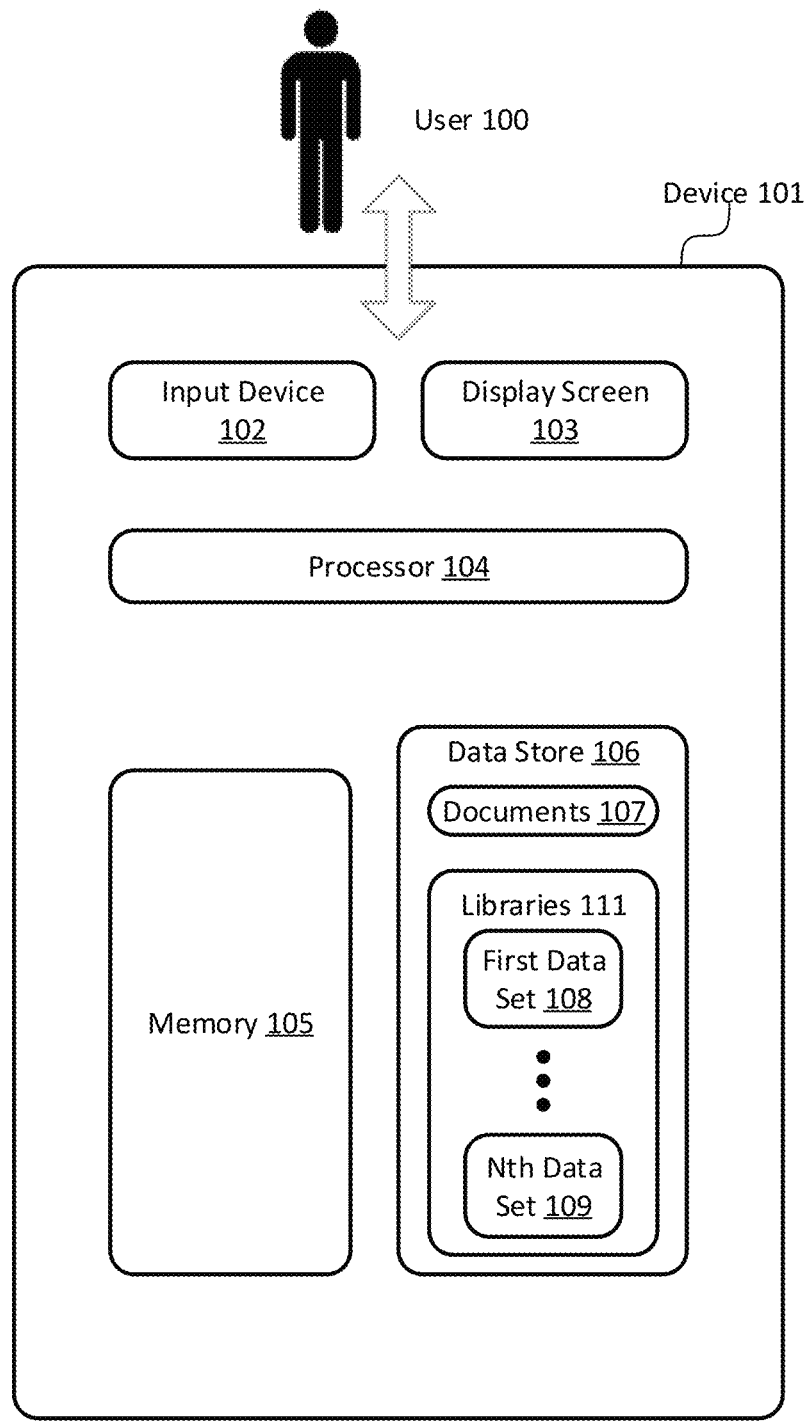
FIG. 1A is a block diagram depicting a hardware architecture for practicing the present invention according to one embodiment of the present invention.

Referring now to FIG. 1A, there is shown a block diagram depicting a hardware architecture for practicing the present invention, according to one embodiment. Such an architecture can be used, for example, for implementing the techniques of the present invention in a computer or other device 101. Device 101 may be any electronic device equipped to receive, store, and/or present information, and to receive user input in connect with such information.

In at least one embodiment, device 101 has a number of hardware components well known to those skilled in the art. Input device 102 can be any element that receives input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech.

Data store 106 can be any magnetic, optical, or electronic storage device for data in digital form; examples include flash memory, magnetic hard drive, CD-ROM, DVD-ROM, or the like. In at least one embodiment, data store 106 stores information which may include documents 107 and/or libraries 111 that can be utilized and/or displayed according to the techniques of the present invention, as described below. In another embodiment, documents 107 and/or libraries 111 can be stored elsewhere, and retrieved by device 101 when needed for presentation to user 100. Libraries 111 may include one or more data sets, including a first data set 109, and optionally, a plurality of additional data sets up to an nth data set 119.

Display screen 103 can be any element that graphically displays documents 107, libraries 111, and/or the results of steps performed on documents 107 and/or libraries 111 to provide data output incident to presenting and/or combining data visualization. Such data output may include, for example, data visualizations, queries requesting confirmation and/or parameters for combination of data visualizations, and the like. In at least one embodiment where only some of the desired output is presented at a time, a dynamic control, such as a scrolling mechanism, may be available via input device 102 to change which information is currently displayed, and/or to alter the manner in which the information is displayed.

Processor 104 can be a conventional microprocessor for performing operations on data under the direction of software, according to well-known techniques. Memory 105 can be random-access memory, having a structure and architecture as are known in the art, for use by processor 104 in the course of running software.

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, or by any other appropriate means. This communication with other electronic devices is provided as an example and is not necessary to practice the invention.

In at least one embodiment, data store 106 is detachable in the form of a CD-ROM, DVD, flash drive, USB hard drive, or the like. Documents 107 and/or libraries 111 can be entered from a source outside of device 101 into a data store 106 that is detachable, and later displayed after the data store 106 is connected to device 101. In another embodiment, data store 106 is fixed within device 101.

Figure 1B:
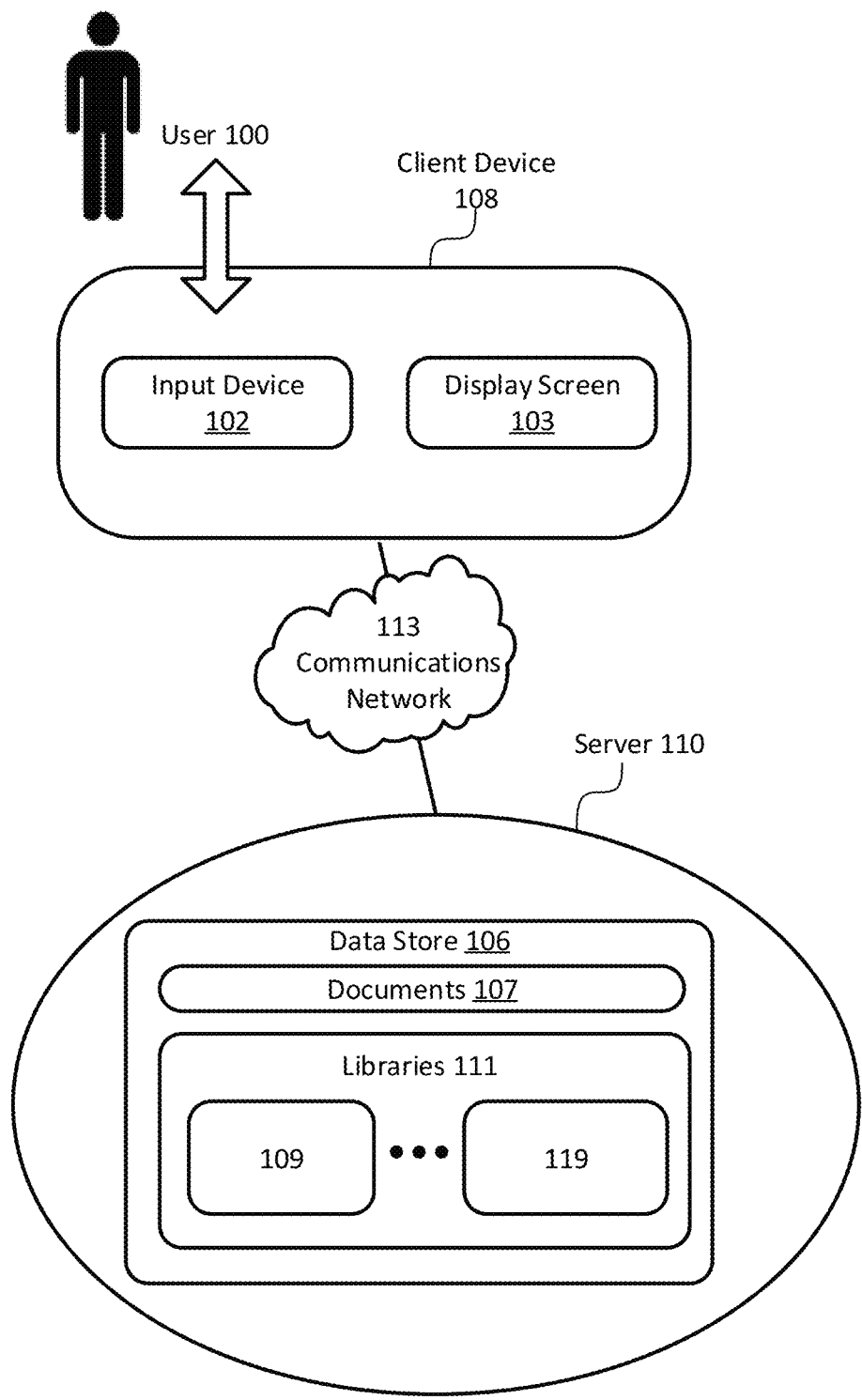
FIG. 1B is a block diagram depicting a hardware architecture for practicing the present invention in a client/server environment, according to one embodiment of the present invention.

Referring now to FIG. 1B, there is shown a block diagram depicting a hardware architecture for practicing the present invention in a client/server environment, according to one embodiment of the present invention. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Documents 107, data, and/or libraries 111 can be presented as part of such web pages and/or other web-based resources, using known protocols and languages such as Hypertext Markup Language (HTML), Java, JavaScript, and the like.

Client device 108 can be any electronic device incorporating the input device 102 and/or display screen 103, such as a desktop computer, laptop computer, personal digital assistant (PDA), cellular telephone, smartphone, music player, handheld computer, tablet computer, kiosk, game system, or the like. Any suitable type of communications network 113, such as the Internet, can be used as the mechanism for transmitting data between client device 108 and server 110, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof In at least one embodiment, client device 108 transmits requests for data via communications network 113, and receives responses from server 110 containing the requested data.

In this implementation, server 110 is responsible for data storage and processing, and incorporates data store 106 for storing documents 107 and/or libraries 111. Server 110 may include additional components as needed for retrieving data and/or libraries 111 from data store 106 in response to requests from client device 108.

In at least one embodiment, documents 107 are organized into one or more well-ordered data sets, with one or more data entries in each set. Data store 106, however, can have any suitable structure. Accordingly, the particular organization of documents 107 within data store 106 need not resemble the form in which documents 107 are displayed to user 100. In at least one embodiment, an identifying label is also stored along with each data entry, to be displayed along with each data entry.

In at least one embodiment, libraries 111 are organized in a file system within data store 106. Appropriate indexing can be provided to associate particular documents with particular quantitative data elements, reports, other documents, and/or the like. Libraries 111 may include any of a wide variety of data structures known in the database arts. As in FIG. 1A, libraries 111 may include one or more data sets, including a first data set 109, and optionally, a plurality of additional data sets up to an nth data set 119.

Documents 107 can be retrieved from client-based or server-based data store 106, and/or from any other source. In at least one embodiment, input device 102 is configured to receive data entries from user 100, to be added to documents 107 held in data store 106. User 100 may provide such data entries via the hardware and software components described above according to means that are well known to those skilled in the art.

Display screen 103 can be any element that graphically displays documents 107, libraries 111, and/or the results of steps performed on the information in documents 107 and/or libraries 111 to provide data output incident to presenting and/or combining data visualization. Such data output may include, for example, data visualizations, queries requesting confirmation and/or parameters for combination of data visualizations, and the like. In at least one embodiment where only some of the desired output is presented at a time, a dynamic control, such as a scrolling mechanism, may be available via input device 102 to change which information is currently displayed, and/or to alter the manner in which the information is displayed.

In at least one embodiment, the information displayed on display screen 103 may include data in text and/or graphical form. Such data may comprise visual cues, such as height, distance, and/or area, to convey the value of each data entry. In at least one embodiment, labels accompany data entries on display screen 103, or can be displayed when user 100 taps on or clicks on a data entry, or causes an onscreen cursor to hover over a data entry.

Furthermore, as described in more detail below, display screen 103 can selectively present a wide variety of data related to presenting and/or combining data visualizations. In particular, as described herein, user 100 can provide input, such as a selection from a menu containing a variety of options, to determine the various characteristics of the information presented such as the type, scope, and/or format of the information to be displayed on display screen 103.

In one embodiment, the system can be implemented as software written in any suitable computer programming language, whether in a standalone or client/server architecture. Alternatively, it may be implemented and/or embedded in hardware.

Data Set and Visualization Structure

In general, a data set may include one or more pieces of data. Each piece of data may be of any desired length and format. Thus, each piece of data may be a character string, integer, floating point number, or any other type of data, and may thus represent any information such as names, times, dates, currency amounts, percentages, fractions, physical dimensions, or any other data that may desirably be stored in a computer.

In some instances, a data set may be stored as an array or with any other storage structure known in the art. A data set may have only a single data series (for example, a quantity measured at a constant time interval, with no attached date information). Alternatively, a data set may have two data series (for example, a quantity measured daily, with the date also stored in association with each daily measurement). Yet further, a data set may have more than two data series (for example, multiple different quantities measured daily, with the date also stored in association with each set of daily measurements).

Figure 2:
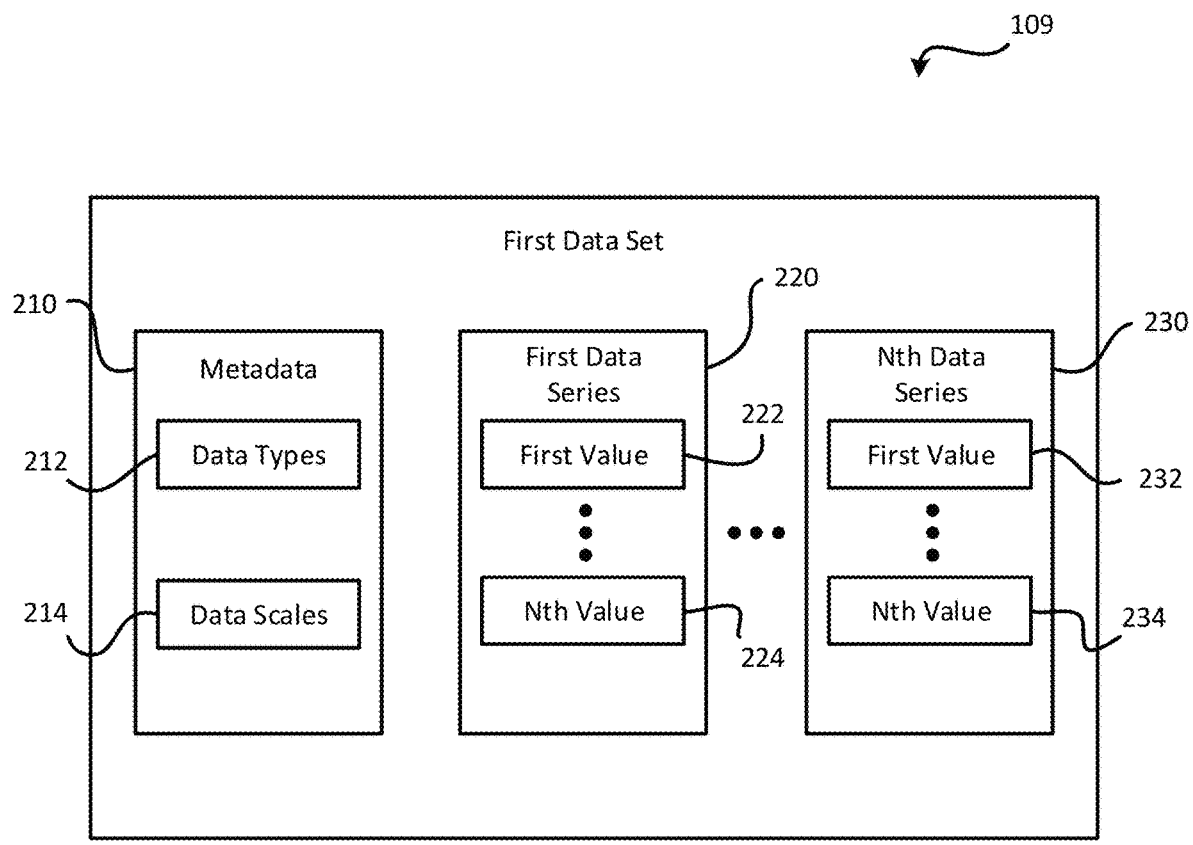
FIG. 2 is a block diagram depicting the structure of a data set according to one embodiment of the present invention.

FIG. 2 is a block diagram depicting the structure of a data set according to one embodiment of the present invention. The data set of FIG. 2 may be, for example, the first data set 109 of FIG. 1A and FIG. 1B.

The first data set 109 may have metadata 210 that provides helpful information about the data stored in the first data set 109. The metadata 210 may permit a user or program to obtain information about the data stored within the first data set 109 without retrieving and/or analyzing any of the data itself. Thus, the metadata 210 may optionally include, but need not be limited to, information such as the data types 212 and/or data scales 214 the data within the first data set 109. The data types 212 and/or the data scales 214 may be broken down by data series within the first data set 109.

The data type 212 of data may relate to whether the data represents a currency, date, character string, or the like. Further, the data type 212 may provide more detailed information on what the data represents. For example, the data type 212 may specify that the data in a data series of the first data set 109 relates to sales within the northwestern region of the U.S.

The data scales 214 may indicate the scope of the data stored within a data series of the first data set 109. For example, the data scales may indicate that a series of date data begins on Jan. 1, 2009 and terminates on Jun. 30, 2014. Although the scale of a data series may be inferred from retrieving the data and sorting the data to find the highest and lowest values, providing this information within the metadata 210 may make this information more readily obtainable, and may also provide the actual end points for a series that does not include the real end points (for example, data recording began on January 1, but the first data point was not actually obtained until January 3).

In addition to the metadata 210, the first data set 109 may have one or more data series. Thus, the first data set 109 may have a first data series 220, and optionally, additional data series up to an nth data series 230. The first data series 220 may have one or more pieces of data, starting with a first value 222 and optionally, terminating with an nth value 224. Similarly, the nth data series 230 may have one or more pieces of data starting with a first value 232 and, optionally, terminating with an nth value 234. The type and/or scale of each of the data series, from the first data series 220 up to the nth data series 230, may be stored within the data types 212 and/or the data scales 214 of the metadata 210.

A data visualization may include any of a wide variety of ways to represent the data of a data set to facilitate viewing, comprehension, and/or analysis by the user. Thus, a data visualization may include a chart, graph, infographic, map, or any other data representation. The device 101 and/or the client device 108 may facilitate creation of a data visualization of each of the data sets within libraries 111, from the first data set 109 up to the nth data set 119.

Figure 3:
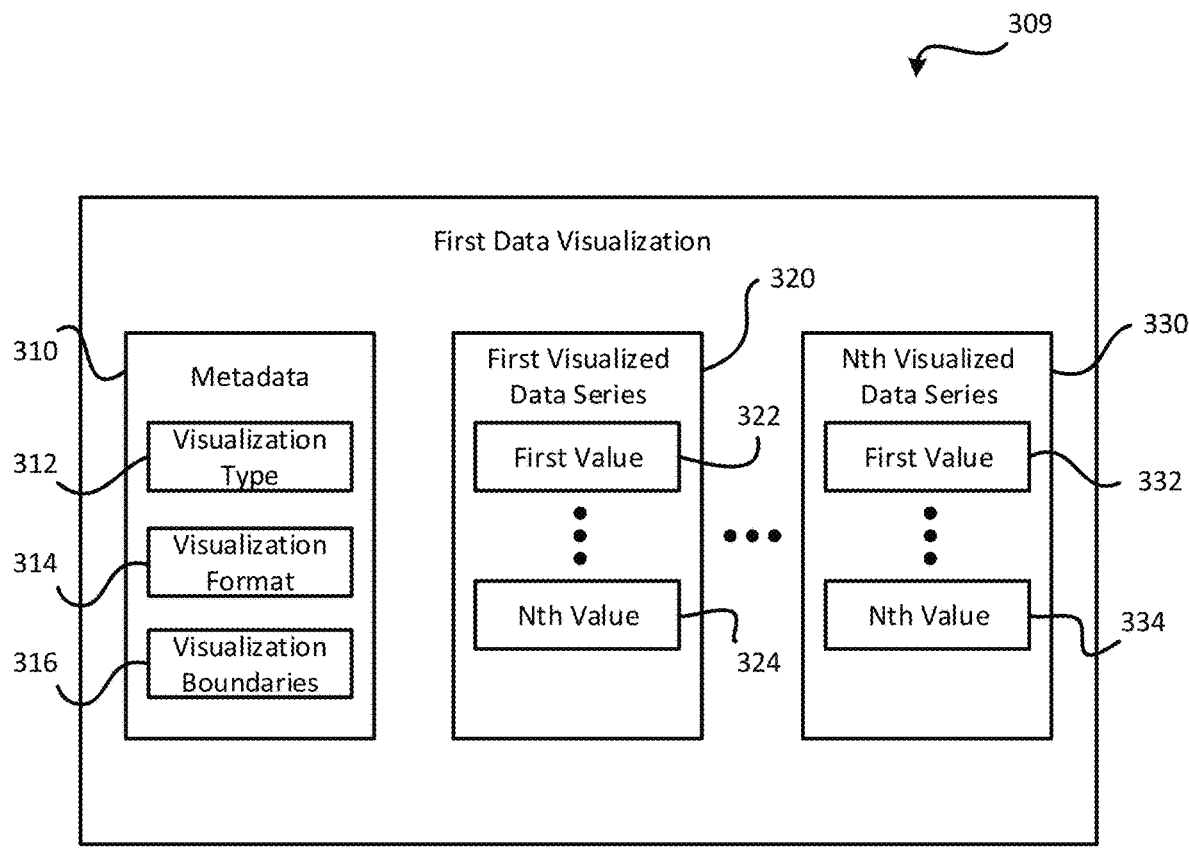
FIG. 3 is a block diagram depicting the structure of a data visualization according to one embodiment of the present invention.

FIG. 3 is a block diagram depicting the structure of a data visualization according to one embodiment of the present invention. The data visualization shown may be a first data visualization 309 based on the first data set 109. Thus, the first data visualization 309 may facilitate viewing, comprehension, and/or analysis of the first data set 109 by the user 100.

The first data visualization 309 may have metadata 310, which may also include information regarding the first data visualization 309 and/or the data illustrated by the first data visualization 309. Thus, the metadata 310 may optionally include, but need not be limited to, a visualization type 312, a visualization format 314, and/or visualization boundaries 316.

The visualization type 312 may specify whether the first data visualization 309 is a chart, graph, infographic, map, or other visualization type. The visualization type 312 may provide further detail about the first data visualization 309 such as, in the case of a graph, whether the graph is a line graph, bar graph, 3D graph, etc. If desired, the visualization type 312 may further provide information regarding the data presented by the first data visualization, such as the data types 212 and/or the data scales 214 of the first data set 109 on which the first data visualization 309 is based.

The visualization format 314 may provide more detailed information regarding the manner in which the first data visualization 309 is formatted. For example, the visualization format 314 may specify which data series of the first data set 109 is shown on each axis of a chart, specify the colors, fonts, and/or shapes to be used for each data series on a map, or the like.

The visualization boundaries 316 may indicate the limits of the first data visualization 309. For example, if the first data visualization 309 is a map, the visualization boundaries 316 may indicate the extents of the map. If the first data visualization 309 is a graph, the visualization boundaries 316 may indicate the end points of each axis.

The various components of the metadata 310, including the visualization type 312, the visualization format 314, and the visualization boundaries 316 may be based on user selections made in the creation of the first data visualization 309. Alternatively, the metadata 310 may include one or more parameters automatically determined by the device 101 and/or the client device 108 during the creation of the first data visualization 309. In the alternative, the metadata 310 may be omitted, and the information from the metadata 310 may be obtained from the data presented by the first data visualization 309.

The first data visualization 309 may also have a first visualized data series 320 and an nth visualized data series 330, which may correspond to the first data series 220 and the nth data series 230 of the first data set 109. Thus, the first visualized data series 320 may have a first value 322 and, optionally, additional values up to an nth value 324. Similarly, the second visualized data series 330 may have a first value 332 and, optionally, additional values up to an nth value 334. The values of the first visualized data series 320 and the second visualized data series 330 may be the same as (i.e., copies of) those of the first data series 220 and the nth data series 230 of the first data set 109. In the alternative, the first data visualization 309 need not contain the first visualized data series 320 and the second visualized data series 330, but may instead link directly to the first data series 220 and the nth data series 230 of the first data set 109.

As mentioned previously, the device 101 and/or the client device 108 may facilitate creation of a data visualization for each data set of libraries 111. Thus, in addition to the first data visualization 309, there may be one or more data visualizations, up to an nth data visualization (not shown) corresponding to the nth data set 119. These data visualizations may be present on the display screen 103 and/or within a document of documents 107, or may be located elsewhere within the data store 106.

The present invention may facilitate automated combination of multiple data visualizations to provide a combined data visualization without the need for the user 100 to manually combine the underlying data sets. According to one example, the user 100 may click on one data visualization (such as the first data visualization 309), drag it onto a second data visualization, and then release it to indicate a desire to combine the first data visualization 309 with the second data visualization. The present invention may enable combination of the first data visualization 309 with the second data visualization without requiring the user to view, analyze, combine, or otherwise manipulate the first data set 109 and the second data set on which the second data visualization is based. One exemplary system that may be used to implement this method will be shown and described subsequently.

Conceptual Architecture

In at least one embodiment, the system of the present invention enables automated combination of two data sets with a high likelihood of generating a combined visualization that presents the data of both data sets in a manner that is useful to the user. The combined visualization may be generated by identifying one or more keys that are shared between the data sets, and then constructing the combined visualization based on the shared keys. The user may be queried to confirm that he or she wants to produce the combined visualization, and may also be queried as to the type, scope, and/or format of the combined visualization; alternatively, default characteristics can be chosen automatically. Then, the combined visualization may be generated based on the combined data set and presented to the user.

Figure 4:
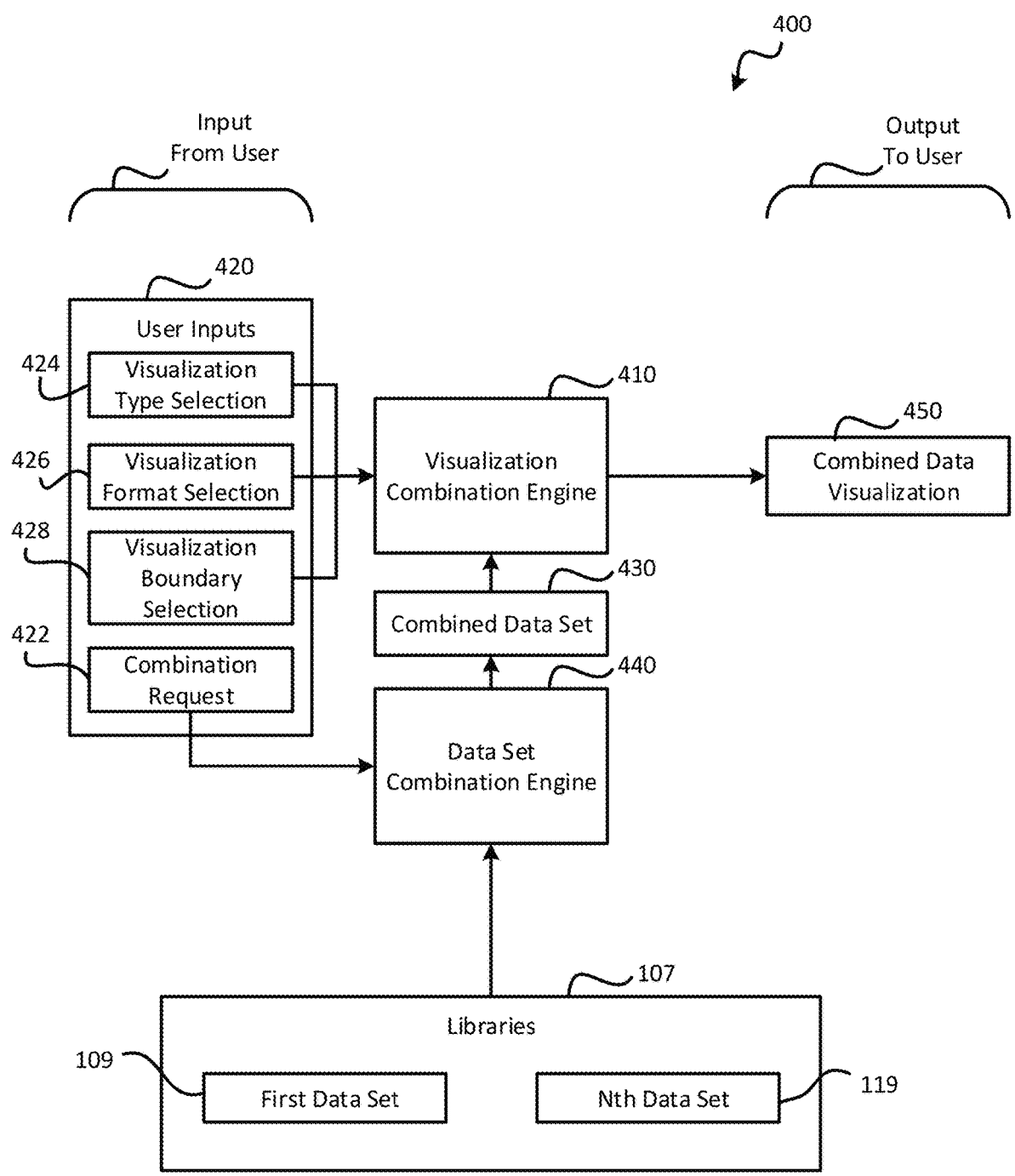
FIG. 4 is a block diagram depicting a system for carrying out automatic data visualization combination, according to one embodiment of the present invention.

FIG. 4 is a block diagram depicting a system 400 for carrying out automatic data visualization combination, according to one embodiment of the present invention. As shown, the system 400 may have a data visualization combination engine 410 that receives various inputs from the user 100 and, based on those inputs, generates the desired combined data visualization 450.

More specifically, the system 400 may receive, from the user 100, one or more user inputs 420, which may be provided by the user 100 via the input device 102. The user inputs 420 may optionally include, but need not be limited to, a combination request 422, a visualization type selection 424, a visualization format selection 426, and a visualization boundary selection 428.

The combination request 422 may encompass any input by the user 100 that indicates a desire to combine two data visualizations. The drag-and-drop method mentioned previously is one example of a combination request 422. For example, the user 100 may, with an input device 102 such as a mouse, click on the first data visualization 309 and drag it on top of a second data visualization based on a second data set such as the nth data set 119. However, any other suitable input can be used for indicating a desire to combine two data visualizations, including for example, selection from a menu, activation of an on-screen button, and/or keyboard input.

The visualization type selection 424 may encompass any input by the user 100 that indicates the type of visualization desired for the combined data visualization 450. The visualization type selection 424 may thus include any or all the information set forth in the description of the visualization type 312 of the first data visualization 309.

Similarly, the visualization format selection 426 may encompass any input by the user 100 that indicates the desired format for the combined data visualization 450. The visualization format selection 426 may thus include any or all of the information set forth in the description of the visualization format 314 of the first data visualization 309.

By the same token, the visualization boundary selection 428 may encompass any input by the user 100 that indicates the desired boundaries for the combined data visualization 450. The visualization boundary selection 428 may thus include any or all of the information set forth in the description of the visualization boundaries 316 of the first data visualization 309.

Again, any or all of 424, 426, and/or 428 can be omitted, in which case default values are used for the corresponding characteristics of combined data visualization 450.

The combination request 422 may be received by a data set combination engine 440. The data set combination engine 440 may begin by retrieving the first data set 109 and the second data set from libraries 111 of the data store 106. The second data set may be, for example, the nth data set 119. The data set combination engine 440 may then analyze and/or compare the first data set 109 with the nth data set 119 to determine whether the first data set 109 and the nth data set 119 can be combined. If they can be combined, the data set combination engine 440 may automatically create the combined data set 430 with little or no user involvement.

The combined data set 430 may be conveyed to the data visualization combination engine 410. The data visualization combination engine 410 may use the combined data set 430 to generate the combined data visualization 450. Optionally, user input 420 in addition to the combination request 422, such as the visualization type selection 424, the visualization format selection 426, and the visualization boundary selection 428, may be queried for and/or received by the data visualization combination engine 410 from the user 100. The data visualization combination engine 410 may use these pieces of information to determine the characteristics of the combined data visualization 450, such as the visualization type 312, visualization format 314, and visualization boundaries 316 of the combined data visualization 450.

Once the combined data set 450 has been generated, the system 400 may output the combined data visualization 450 to the user 100. This may be done by, for example, printing the combined data visualization 450 on a printing device, displaying the combined data visualization 450 on the display screen 103, saving the combined data visualization 450 in the memory 105 or the data store 106, including saving the combined data visualization 450 to a document of documents 107, transmitting the combined data visualization 450 to a different device or client device, and/or the like.

Automatic Visualization Combination

Figure 5:
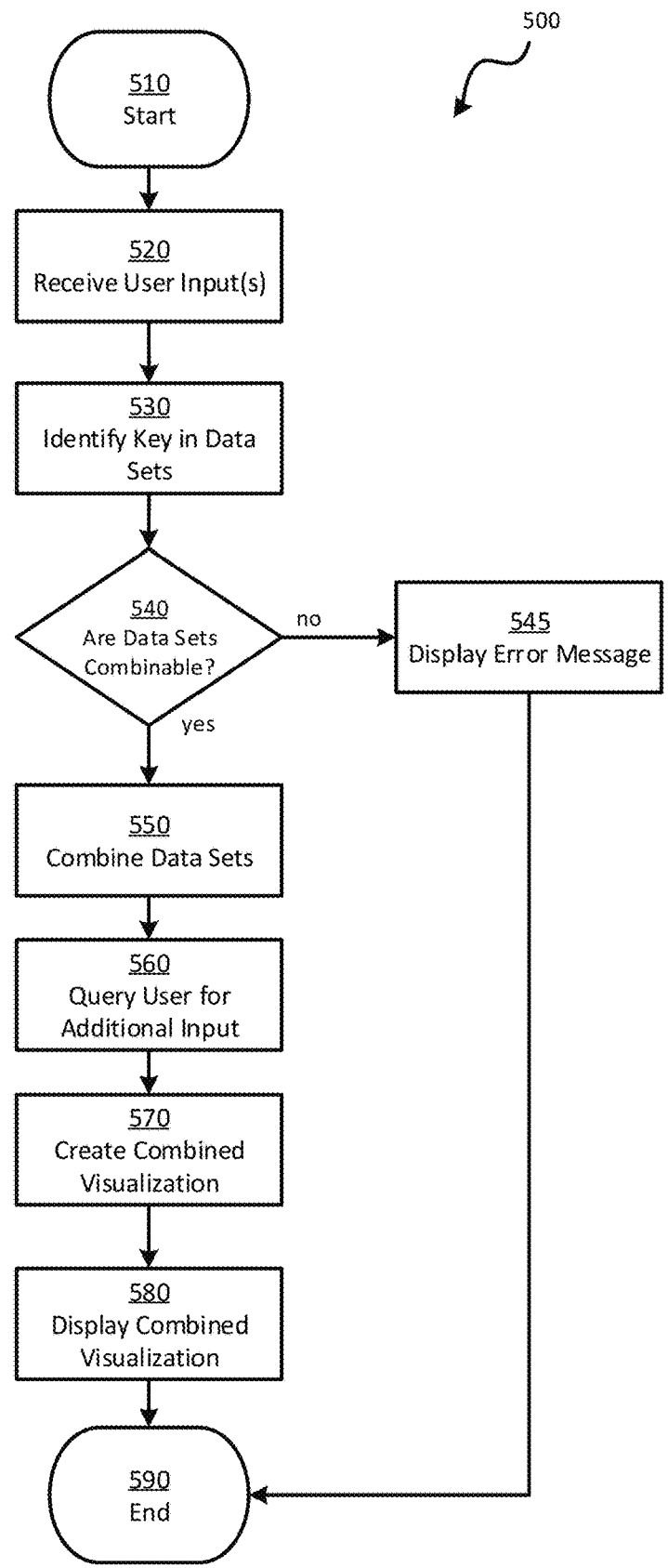
FIG. 5 is a flowchart depicting a method of carrying out automatic data visualization combination, according to one embodiment of the present invention.

FIG. 5 is a flowchart depicting a method 500 of automatic data visualization combination according to one embodiment of the present invention. The method 500 may be carried out, at least in part, by the system 400 as in FIG. 4, or with a differently-configured data visualization combination system. The method 500 may be performed in connection with input from a user; such a user may be a developer, customer, enterprise leader, sales representative for business intelligence services, or any other individual. FIG. 5 illustrates a series of steps in a certain order, but those of skill in the art will recognize that these steps may be re-ordered, omitted, replaced with other steps, or supplemented with additional steps, consistent with the spirit of the invention.

The method 500 may start 510 with a step 520 by which the system 400 receives one or more user inputs 420. The user inputs 420 received in the step 520 of the method 500 may be some or all of the user inputs 420 of FIG. 4, or may include additional user inputs not shown in FIG. 4. According to one embodiment, the only piece of the user input 420 received in the step 520 may be the combination request 422. The remaining pieces of user input 420 may be queried for and/or received by the system 400 subsequently.

As mentioned previously, the combination request 422 may be conveyed to the system 400, for example, by clicking and dragging a data visualization, such as the first data visualization 309, onto a second data visualization, and then releasing it. However, the user 100 may provide the combination request 422 in a variety of alternative methods. For example, the user 100 may select the first data visualization 309 and the second data visualization through any of a variety of methods known in the art for selecting multiple objects (such as holding down CTRL while selecting second object to expand the selection). The user 100 may then select from a menu, provide text or speech entry, or otherwise provide input constituting the combination request 422. Alternatively, the user 100 may manipulate icons representing the first data visualization 309 and/or the second data visualization to provide the combination request 422.

As another alternative, the user 100 may select the first data set 109 and/or the nth data set 119 in place of selecting the first data visualization 309 or the second data visualization. The user may do this by clicking and dragging the nth data set 119 on top of the first, manipulating icons corresponding to the first data set 109 and/or the nth data set 119, and/or selecting the data sets and indicating a desire to combine them via a menu, text entry, speech, or other methods.

If desired, the user 100 may be presented by the system 400 with a cue. The cue may take the form of:
- a cursor change;
- a pop-up message;
- a pop-up icon;
- a drop target icon;
- a drop target highlight;
- a sound; and/or
- any other GUI and/or text element that indicates the pending combination and/or requests confirmation of the combination.

The user 100 may then be able to confirm that he or she desires to make the combination, thereby finalizing the combination request 422.

Once the combination request 422 has been received, the method 500 may proceed to a step 530 in which the system 400, or more specifically the data set combination engine 440, looks for a key that is shared between the first data set 109 and the nth data set 119. The key may be data that is data that is present in one or both of the first data set 109 and the nth data set 119. Alternatively, the key may be data that defines a target to which data in one or both of the first data set 109 and the nth data set 119 can be adapted. The key may thus be data that is present within the first data set 109 or the nth data set 119 that defines a target to which data in the other data set can be adapted. Adaptation of the key will be explained subsequently.

Looking for the key may entail performing a variety of different steps relative to the first data set 109 and the nth data set 119. For example, a key may be derived by:
- using a logical connection that was already indicated by the connection between the visualization and its data;
- finding exactly matching keys in an automated process;
- matching column data types, such as number or date time; and/or
- using more advanced analytics that detect attributes that are combinable, such as character data that only has 2 characters in its data set, or whose data union contains 90% similar unique values.

Once the system 400 has identified, or attempted to identify, the key, the method 500 may proceed to a query 540 in which the system 400 determines whether the first data set 109 and the nth data set 119 are combinable. This may be as simple as determining that the first data set 109 and the nth data set 119 are combinable if the key was successfully identified, and determining that they are not combinable if the key was not successfully identified.

Alternatively, more steps and/or queries may be involved. For example, the system 400 may compare the metadata 210 and/or the data of the first data series 220 through the nth data series 230 of the first data set 109 with those of the nth data set 119 to determine whether the data in the first data set 109 is combinable with that of the nth data set 119. Combinability may be determined by comparing data types 212, data scales 214, and/or any other characteristics of the data sets to be combined.

If the first data set 109 an the nth data set 119 are not combinable, the method 500 may proceed to a step 545 in which an error message is displayed for the user 100 indicating that the first data set 109 and the nth data set 119 are not combinable and/or that the first data visualization 309 cannot be combined with the nth data visualization. Alternatively, the system may generate a display depicting the data sets side-by-side or in some other arrangement. Such an arrangement may facilitate manual combination of the data sets by the user. If desired, queries or other input elements may be displayed to allow a user to provide the input needed to make the data sets combinable (for example, by allowing the user to manually select the key from each of the data sets, enter missing data types, and/or the like).

According to another alternative, if the first data set 109 and the nth data set 119 are not combinable, a unified data visualization may be produced and/or displayed, as will be shown and described in connection with FIG. 13 below. Generation of the unified data visualization may provide some of the benefits of data visualization combination without requiring combination of the underlying data sets.

If the first data set 109 and the nth data set 119 are combinable, the method 500 may proceed to a step 550 in which the first data set 109 and the nth data set 119 are combined to generate the combined data set 430. The combined data set 430 may optionally be stored within the data store 106, or simply kept in the memory 105 until the combined data visualization 450 has been generated. The combined data set 430 need not be retrieved, manipulated, or even viewed by the user 100. Thus, the combined data set 430 may exist completely without the knowledge of the user 100. In the alternative, the system 400 may provide the user 100 with some control over the structure, format, and /or scope of the data set 430. In some embodiments, the step 550 may be automatically carried out, with optional user overrides to control aspects of the combined data set 430.

The system 400 may automatically combine the first data set 109 and the nth data set 119 based on the most logical data connection scheme. According to one example, this may be done by adapting the data of one or both of the first data set 109 and the nth data set 119 to the key identified in the step 530.

Adaptation of data to a key may entail conversion of the data to match the key so that the data can be effectively merged, within the combined data representation, with the data of the key. Thus, adaptation of the data may entail altering the format, scale, data type, or other data characteristics of the data to match the key. Adaptation of the data may include altering the values of the data of the other data set to match the key by extrapolation, curve fitting, or other methods.

For example, the first data series 220 of the first data set 109 may include time intervals taken on a daily basis, and the nth data series 230 of the first data set 109 may include measurements taken on each day of the first data series 220. The nth data set 119 may have a first data series 220 that includes time intervals taken on a weekly basis, and a second data series that includes measurements taken on each week of the first data series. If the first data series 220 of the first data set 109 is used as the key, the first data series 220 of the nth data set 119 may be altered to match the key by adding six more dates for each week, thereby providing a daily interval that matches that of the first data series 220 of the first data set 109.

Additionally, data may be added to the data of the nth data series 230 of the nth data set 119 to provide daily data rather than just weekly data. This may be done, for example, by fitting the data of the nth data series 230 of the nth data set 119 to a curve, or using other analytical and/or mathematical procedures to determine, based on the weekly data available, what the daily data would likely have been had it been sampled.

In the alternative, the first data series 220 of the nth data set 119 may be used as the key. In this case, the first data series 220 and the nth data series 230 of the first data set 109 may be adapted to the key by removing the extra daily data, leaving only weekly data that matches the key.

Once the combined data set 430 has been generated, the method 500 may optionally proceed to a step 560 in which the user 100 is queried for additional input. This may be done by presenting the user 100 with another cue, such as a prompt, which may be any of the types set forth in the discussion of the step 520. The cue may request the entry and/or selection of characteristics of the combined data visualization 450.

According to one example, the cue may confirm that the first data set 109 and the nth data set 119 can be combined, and may also provide a menu of selections whereby the user 100 can provide the visualization type selection 424, the visualization format selection 426, and/or the visualization boundary selection 428. The menu may include default selections made by the system 400 for the visualization type selection 424, the visualization format selection 426, and/or the visualization boundary selection 428. Thus, the user 100 may have the opportunity to select whether to accept the defaults, or to customize the appearance of the combined data visualization 450. Other pieces of user input besides those mentioned herein may additionally or alternatively be collected by the system 400 and used to generate the combined data visualization 450.

Receiving the visualization type selection 424 may entail receiving a user selection to combine two different data visualization types. For example, when combining two horizontal bar charts with the same scale, the system may default to creating a bar chart with two bars per category, one bar for each data set from each chart. The system may prompt the user with options to create a bar-line combo chart, a bar-hat line chart, a stacked bar chart, or 100% stacked bar chart.

After the system 400 has received the user input 420 in addition to the combination request 422, as applicable, the method 500 may proceed to a step 570. In the step 570, the system 400, or more specifically the data visualization combination engine 410, may generate the combined data visualization 450 based on the combined data set 430 and the user input 420 received. The combined data visualization 450 may have the visualization type selection 424, the visualization format selection 426, and/or the visualization boundary selection 428 selected by the user 100 in the step 560. In the alternative, the combined data visualization 450 may have the characteristics, such as the visualization type 312, the visualization format 314, and/or the visualization boundaries 316 of the first data set 109 and/or the nth data set 119.

If the metadata 310 of the first data set 109 is the same as that of the nth data set 119, the combined data visualization 450 may have the same metadata 310 as the first data set 109 and the nth data set 119. According to some examples, if the metadata 310 of the first data set 109 is different from that of the nth data set 119, the combined data visualization 450 may, by default, have the characteristics of the data set that is the target. For example, where the combination request 422 includes clicking and dragging, the combined data visualization 450 may, by default, have the characteristics of the data set on top of which the other data set is dragged (the nth data set 119 if the first data set 109 is dragged on top of the nth data set 119). Alternatively, the combined data visualization 450 may have the metadata 310 of the data set that is first selected and/or moved (e.g., the first data set 109 in the example above). The system 400 may permit any of these default parameters to be overridden by user selection.

Once the combined data visualization 450 has been created, the method 500 may proceed to a step 580 in which the combined data visualization 450 is displayed for the user 100, for example, on the display screen 103. If desired, the step 560, permitting the user 100 to select characteristics of the combined data visualization 450, may be carried out after the step 580 so that the user 100 can view the combined data visualization 450 prior to selecting the visualization type selection 424, the visualization format selection 426, and/or the visualization boundary selection 428.

As mentioned previously, in the alternative to (or in addition to) displaying the combined data visualization 450, the combined data visualization 450 may be stored, printed, transmitted, or otherwise used. Such use of the combined data visualization 450 may be determined based on user selection, pre-selected user preferences, or the like.

The method 500 may then end 590. Examples of performance of the method 500 will be shown and described in connection with FIGS. 6-17, as follows.

EXAMPLES

A wide variety of data visualization combination situations may arise. The following examples are presented by way of illustration and not limitation to indicate how a data visualization combination system such as the system 400 may handle various types of data and data visualizations. For purposes of the discussion below, it will be assumed that the user 100 has provided a combination request 422 by dragging and dropping the first data visualization 309, which is based on the first data set 109, on top of a second data visualization based on the nth data set 119.

Charts with the Same Data Scale and the Same Data Visualization Type

As mentioned previously, combining the first data set 109 with the nth data set 119 may entail inspecting the metadata 310 of each data visualization and/or the metadata 210 of the underlying data sets. If first data visualization 309 and the second data visualization are two charts with data scales (e.g., visualization boundaries 316) that are the same, the system 400 may display the dropped data source (the first data set 109) as another data series within the drop target chart (the second data visualization).

By default, the resulting chart may be a multiple bar chart, but the user may, in the step 560, have the option to change the chart type via the cue mentioned in the description of the step 560. This "chart type picker" can grow or shrink as appropriate to include only those chart types that are supported by the first data set 109 and/or the nth data set 119.

FIG. 6 is a block diagram 600 depicting the combination of two data visualizations according to one example of the invention. FIG. 6 illustrates merging two charts of the same type with the same scale. Thus, Chart 1 is a bar graph and Chart 2 is also a bar graph. The values for the months in both charts may be aggregated; therefore, the resulting chart may be a multi-series chart (the Combined Chart), with each month having each series from both charts represented.

An exemplary cue is illustrated to the right of the Combined Chart. The cue may be displayed before and/or after the Combined Chart has been generated and/or displayed. The cue may provide the user 100 with the option to change the resulting visualization type 312 (e.g., chart type in this example), as shown in the box in the lower right, to confirm the existing chart type, and/or to cancel generation of the Combined Chart. As mentioned previously, such a cue may also offer options besides changing the visualization type 312. For example, the cue may additionally or alternatively allow the user 100 to alter the visualization format 314 and/or the visualization boundaries 316. If the user 100 selects "OK," the Combined Chart may, by default, have the properties of the second chart.

Charts with the Same Data Scale and Different Data Visualization Types

Figure 7:
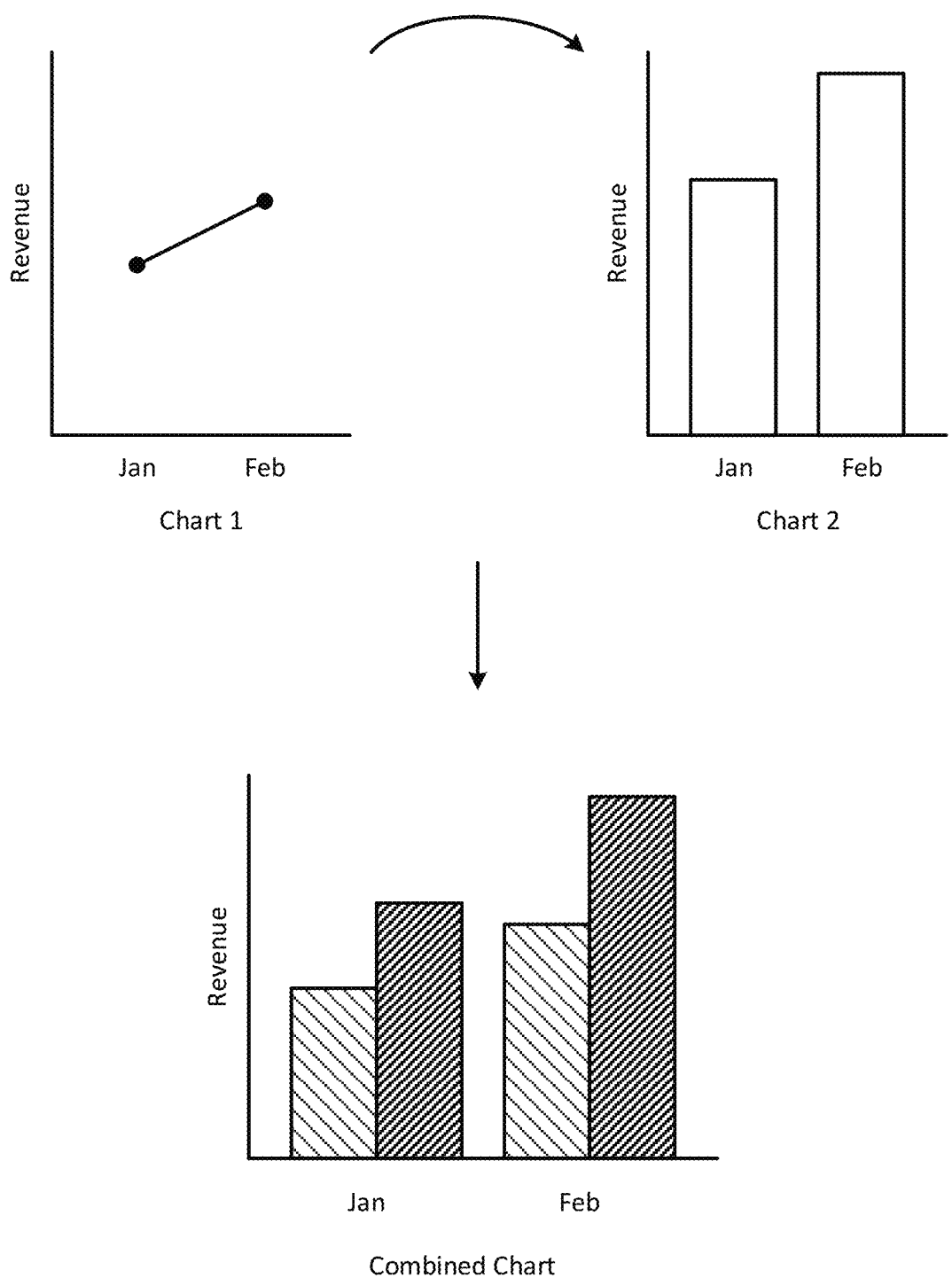
FIG. 7 is a block diagram depicting the combination of two data visualizations according to another example of the invention.

FIG. 7 is a block diagram depicting the combination of two data visualizations according to another example of the invention. FIG. 7 illustrates merging two charts (Chart 1 and Chart 2) of different types with the same scale. In this case, the user may drag a line chart (Chart 1) onto a bar chart (Chart 2). Because the bar chart is the target drop chart, the resulting Combined Chart may appear as a bar chart with an additional series. The cue of FIG. 6 may again be used to permit user customization, confirmation, and/or cancellation of the Combined Chart.

Figure 8:
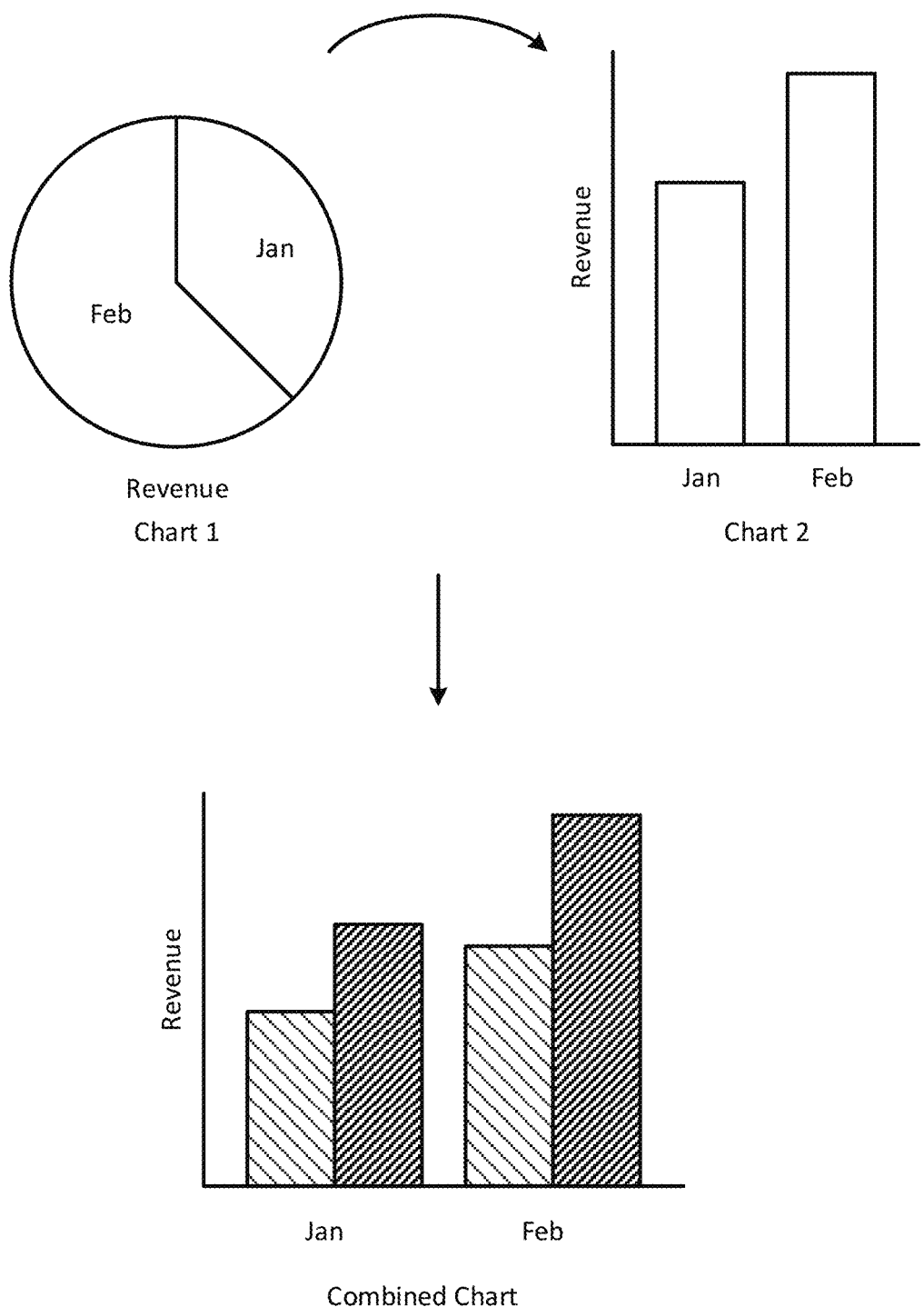
FIG. 8 is a block diagram depicting the combination of two data visualizations according to another example of the invention.

FIG. 8 is a block diagram depicting the combination of two data visualizations according to another example of the invention. Again, two charts (Chart 1 and Chart 2) of different types, with the same scale, may be combined. Since Chart 2 is, again, the drop target, the Combined Chart may again be a multi-series bar chart. The cue of FIG. 6 may again be used as described above.

In FIG. 8, Chart 1 and Chart 2 may be based on data sets with the same data type 212 (i.e., Month and Revenue). The data type 212 may be found in the metadata 310 for each of Chart 1 and Chart 2 and/or in the metadata 210 for the underlying data sets. In the event that one of the data visualizations to be combined presents data with no identifiable data type, the system 400 may assume the data type is the same as the chart with which it is to be combined.

Figure 9:
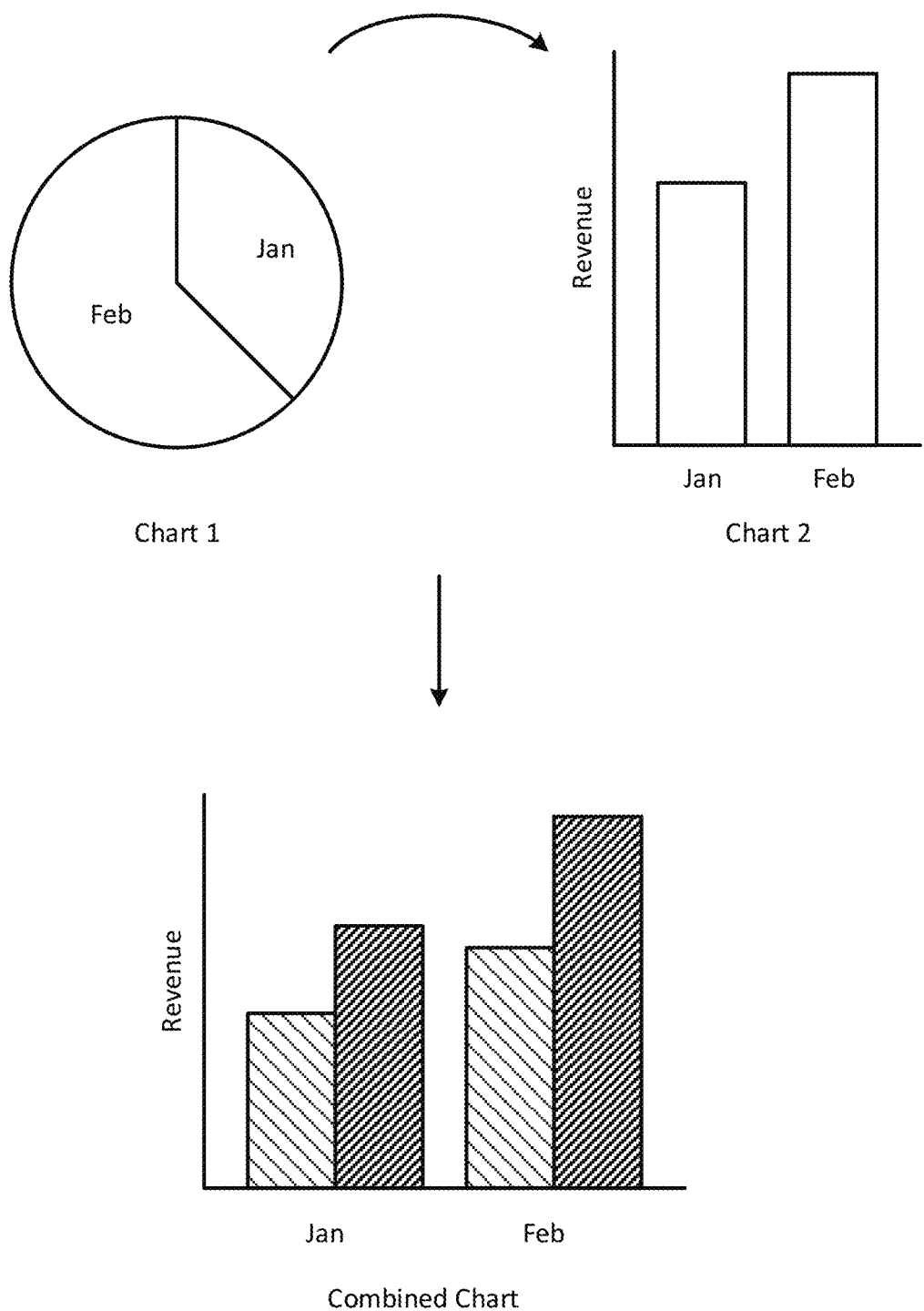
FIG. 9 is a block diagram depicting the combination of two data visualizations according to another example of the invention.

FIG. 9 is a block diagram depicting the combination of two data visualizations according to another example of the invention. More specifically, two charts (Chart 1 and Chart 2) of different types, with the same scale, are to be combined. However, while Chart 2 provides the data type 212 "Revenue" for the y axis, there is no data type 212 indicated for the size of the pie slices of Chart 1. The resulting Combined Chart may assign the data type 212 of the drop target (Chart 2) to the data from Chart 1 with no data type 212. Thus, the combined data may have the type "Revenue," as shown on the Combined Chart.

Charts with Different Data Scales

Figure 10:
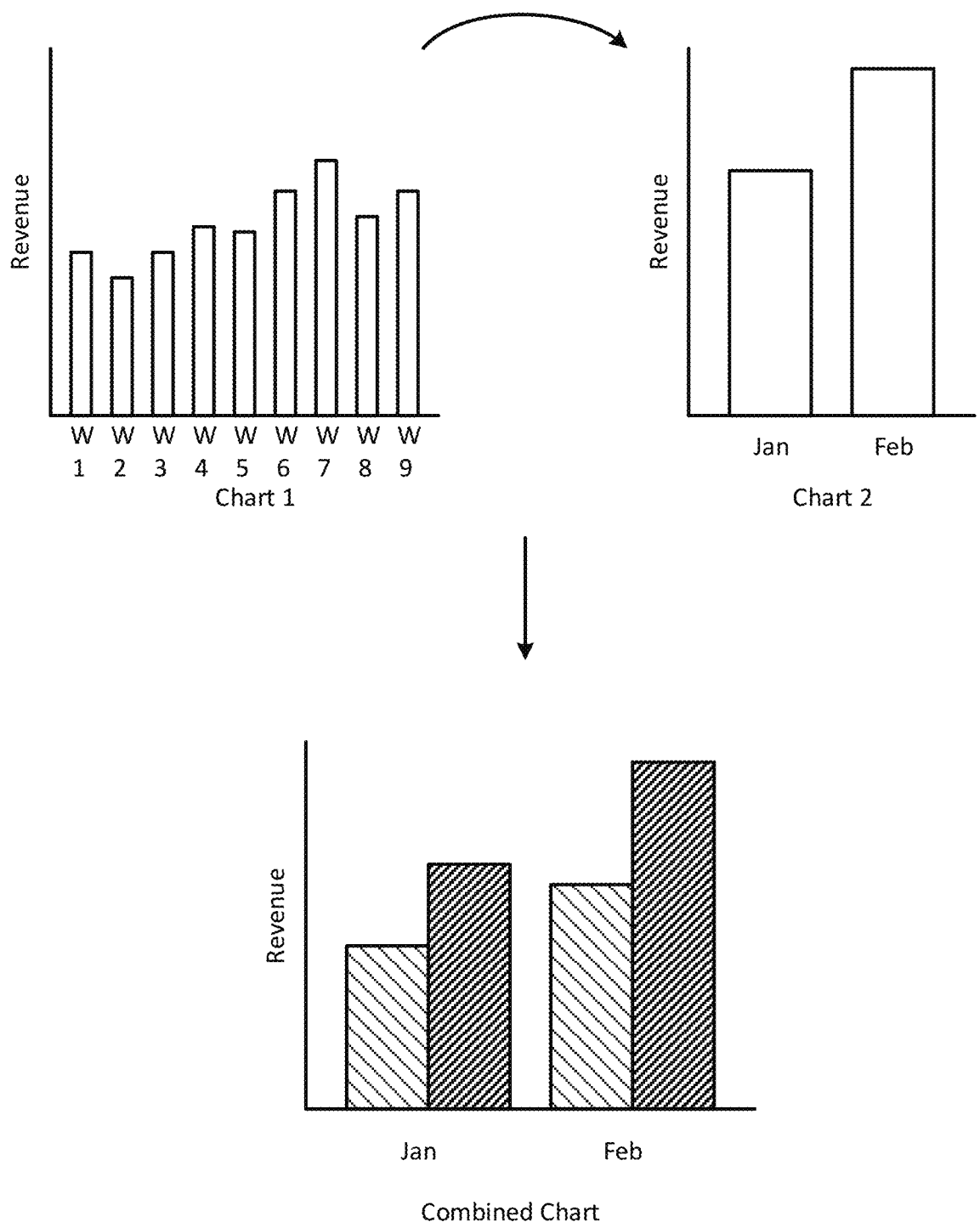
FIG. 10 is a block diagram depicting the combination of two data visualizations according to another example of the invention.
Figure 11:
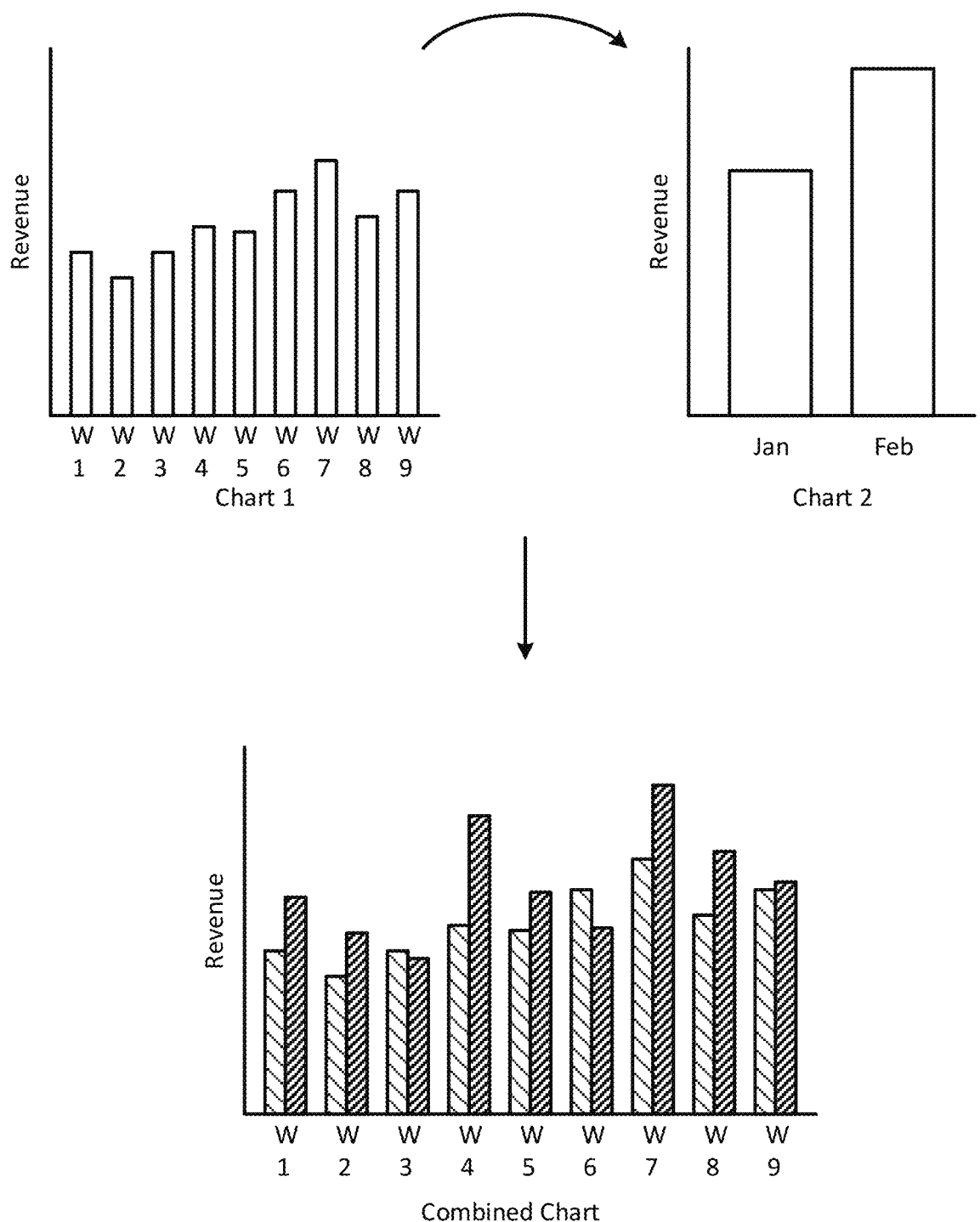
FIG. 11 is a block diagram depicting the combination of two data visualizations according to another example of the invention.

The preceding examples are generally directed to combination of data visualizations that have the same or similar scales. In some embodiments, the data visualizations to be combined may not have the same scale (i.e., they may be based on data sets with different scales). FIG. 10 and FIG. 11 will illustrate how such combinations may be handled by the system 400 of the present invention.

FIG. 10 is a block diagram depicting the combination of two data visualizations according to another example of the invention. The two charts to be combined (Chart 1 and Chart 2) have different scales. More precisely, Chart 1 shows data by week and Chart 2 illustrates data by month. Presumably, the first data set on which Chart 1 is based has data broken down by week, while the second data set on which Chart 2 is based has data broken down by month.

The resulting Combined Chart shows the aggregated data by month. The monthly data of Chart 2 have been transferred directly into the Combined Chart, since the scale of the Combined Chart matches that of Chart 2. The weekly data of Chart 1 have been aggregated into monthly increments. This aggregation may be approximate, since end of a week and the end of a month need not fall on the same day. Accordingly, some extrapolation may be needed.

According to one example, if January begins at the beginning of week 1 from Chart 1, but week 5 from Chart 1 bridges January and February, the system 400 may prorate the data from week 5 and add part to January's total for the Combined Chart, and add the remainder to February's total for the Combined Chart. This may be done by taking the number of days x of week 5 that fall within January, multiplying the Revenue figure for week 5 by x/7, and then adding the resulting amount to the aggregated total for January (the sum of weeks 1, 2, 3, and 4) in the Combined Chart. The remainder may be added to the aggregated total for February in the Combined Chart.

In at least one embodiment, the system may provide an option to use a smaller granularity, even if the data does not directly support the details of the smaller granularity by equally dividing values across smaller granularities. This may be done by extrapolation, curve fitting, and/or other methods known in the art.

FIG. 11 is a block diagram depicting the combination of two data visualizations according to another example of the invention. FIG. 11 more specifically illustrates an example of merging two charts (Chart 1 and Chart 2) with different scales as in FIG. 10, resulting in a Combined Chart showing data broken down by week instead of by month.

Thus, the data from Chart 1 may be transferred directly into the Combined Chart, while the data from Chart 2 may be subjected to extrapolation, curve fitting, or the like to determine the most likely weekly data. This process may include trend analysis, particularly where Chart 2 includes several data points (not just the two illustrated in the example of FIG. 11). This trend analysis may use curve fitting techniques to fit a curve based on a mathematical formula, a known geometric shape, and/or another schema, to the monthly data and then, based on the formula, shape, and/or schema, derive likely weekly data. Thus, the Combined Chart may have data on a finer scale than one or both of the combined charts (Chart 1 and Chart 2).

Charts with Different Data Types

In the foregoing examples, the data visualizations to be merged have generally had the same data types. However, the system 400 may also support combination of data visualizations with different data types.

In at least one embodiment, if two charts are merged that have different data types, the resulting (merged) chart may be a dual-scale line-bar combination graph in which the data from one of the graphs is measured using the bars and the data from the other graph is measured on the line. By default, the data type for the drop target chart may be shown using the bars. The user may have the option to change this functionality. The user may also be able to change the chart type to any other chart type that includes a dual scale.

Figure 12:
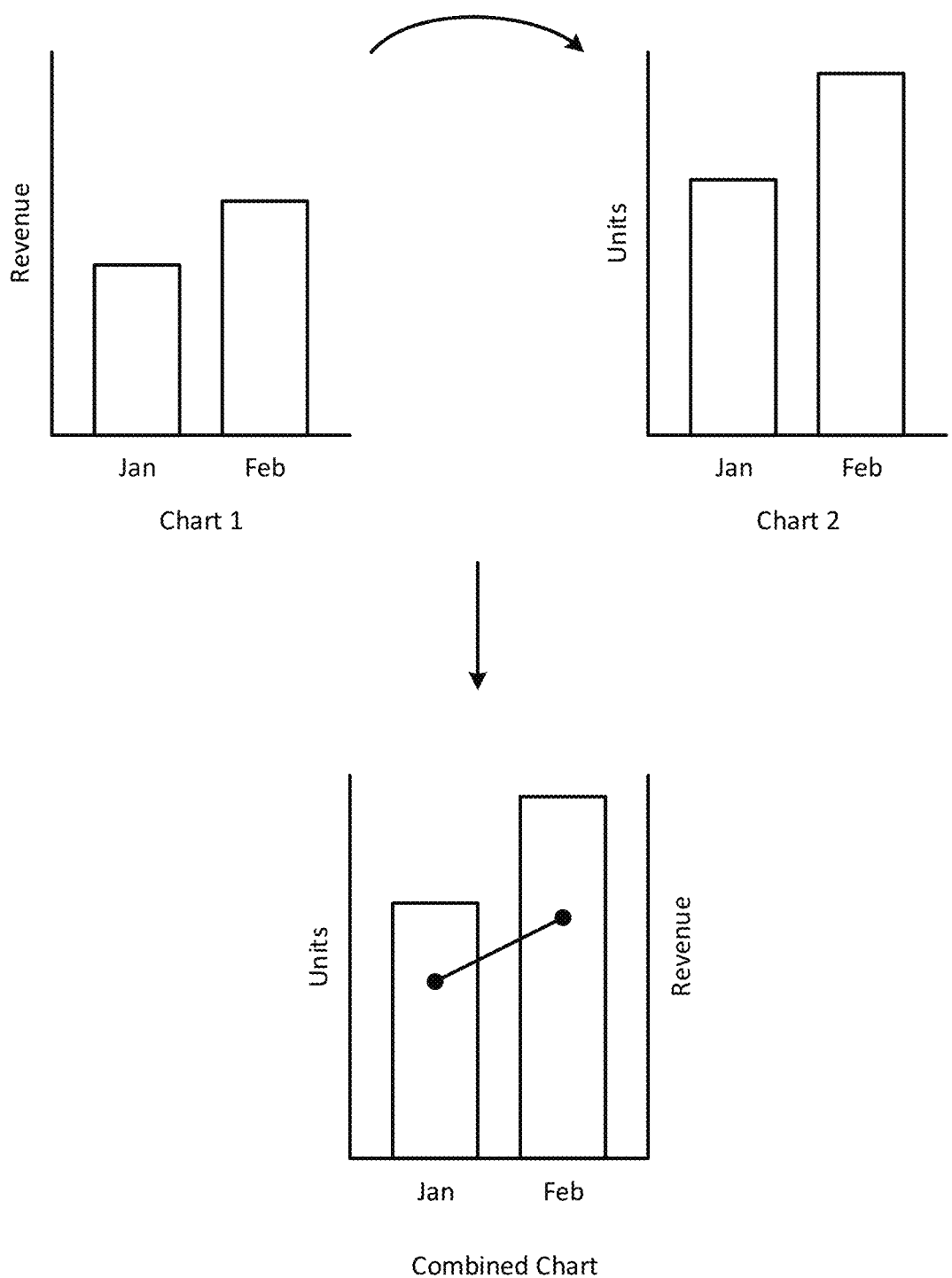
FIG. 12 is a block diagram depicting the combination of two data visualizations according to another example of the invention.

FIG. 12 is a block diagram depicting the combination of two data visualizations according to another example of the invention. FIG. 12 provides an example of merging two charts (Chart 1 and Chart 2) with disparate data types. The data type for Chart 1 may be in dollars ("Revenue"), and the data type for Chart 2 may be in number of units ("Units"). The resulting Combined Chart may be a dual-scale chart in which the dollar values are measured on the line and the units are measured using the bars. In the alternative to the line/bar chart shown in FIG. 12, other dual scale chart types may be used.

Infographics

Generally, the preceding examples may relate to situations in which the data visualizations to be combined are two charts. However, in other examples, one or both data visualizations to be combined may be other types of visualizations such as infographics. Infographics may convey information more pictorially, sometimes with the number or size of icons providing an indication of relative magnitude. In at least one embodiment, if an infographic or chart represents multiple data types, the system may create a prioritized, best-fit list of possible matches and selects the best-fit data type.

In at least one embodiment, if a chart and an infographic are merged, either of two possible scenarios may result. If the data from the chart and the infographic can be aggregated, the system 400 may generate a combined data visualization in the form of a new multi-series combined chart. If the data from the chart and the infographic cannot be aggregated, the infographic and the chart may appear side-by-side in a new visualization. The new visualization may not be a "combined data visualization," but may unify combined data visualizations into a single object that can readily be selected and/or manipulated.

In at least one embodiment, the system 400 may determine whether chart and infographic metadata can be aggregated based on the metadata 310 of the chart and/or the metadata 310 of the infographic, and/or based on the metadata 210 of either or both of the underlying data sets. For example, either the infographic or the data set may contain metadata indicating that a certain value is of the type "currency." The system 400 may look for this metadata and may determine matches based on the metadata of the chart and the metadata of its data set.

FIG. 13 is a block diagram depicting the combination of two data visualizations according to another example of the invention. The data visualizations to be combined may include an infographic (Infographic 1) and a chart (Chart 2). Two possible scenarios are illustrated. If the data can be aggregated, a new multi-series chart may be generated and presented to the user 100, as shown in the lower left-hand corner. Otherwise, a new unified data visualization may be generated, as shown in the lower right-hand corner of FIG. 13. The unified data visualization may present the infographic of Infographic 1 and chart of Chart 2 next to each other, and may provide them as a single object to facilitate operations whereby Infographic 1 and Chart 2 are moved together, scaled together, transmitted together, etc.

Maps

The present invention relates to more than just charts, graphs, and infographics; a wide variety of other data visualizations may additionally or alternatively be combined through the use of the systems and methods presented herein. In at least one embodiment, two data visualizations in the form of two maps may be merged. The metadata 310, and in particular, the visualization boundaries 316, of the two maps may be compared. The visualization boundaries 316 may include, but are not limited to, area names, boundary location points (particularly where boundary lines change direction), map projection types, etc.

After the comparison has been carried out, any of three scenarios are possible:

If the visualization boundaries 316 are the same, the two maps may be combined into a combined visualization in the form of a single combined map with data from both data sets shown within the common boundary.

If the visualization boundaries 316 are similar for the two maps, map layers may be combined. For example, a user may drag a map of Utah showing sales onto a map of the United States showing population by state, and the resulting combined map may show Utah sales and population by state. Or, if the data behind Utah sales is a filtered version of United States sales by state, the resulting map may show sales and population by all states. Rules for maps with the same layer may be the same as those described above.

If the visualization boundaries 316 are not the same and are not similar, both maps may be shown in a single container. This may be done, for example, by presenting the two maps side-by-side in a manner similar to that of Infographic 1 and Chart 2 at the lower right-hand corner of FIG. 13.

In the event that the layers for the two maps to be combined are the same across both maps, the layers in the resulting combined map may be distinguished by color combinations, data labels for one or both layers, one layer being represented three-dimensionally, one of the layers being added as a drill view of the other, etc. For example, a user may combine two maps called "Sales by State" and "U.S. Population by State." Because both of these maps include the state level as the layer, there may advantageously be some differentiation between the layers so that the user can distinguish between them. In this case, the "Sales by State" data may be denoted in the usual way by the colors of the states, and the "U.S. Population by State" data may be denoted by data labels. By default, the target map layer may be denoted by color and the layer of the map being dropped may be denoted by data labels, but users may be able to change this default functionality.

FIG. 14 is a block diagram depicting the combination of two data visualizations according to another example of the invention. FIG. 14 provides an example of merging two maps (Map 1 and Map 2) with the same layer type to generate a Combined Map. Because the population map (Map 2) is the target map, the state layer for the Combined Map may retain the same colors as the original state layer, and in the Combined Map, the sales data from Map 1 may appear as data labels within the pertinent states of Map 2.

As mentioned previously, the layer types of the maps to be combined may be different. In such a case, where the boundaries are the same, the layer of one map may be added to the other.

Figure 15:
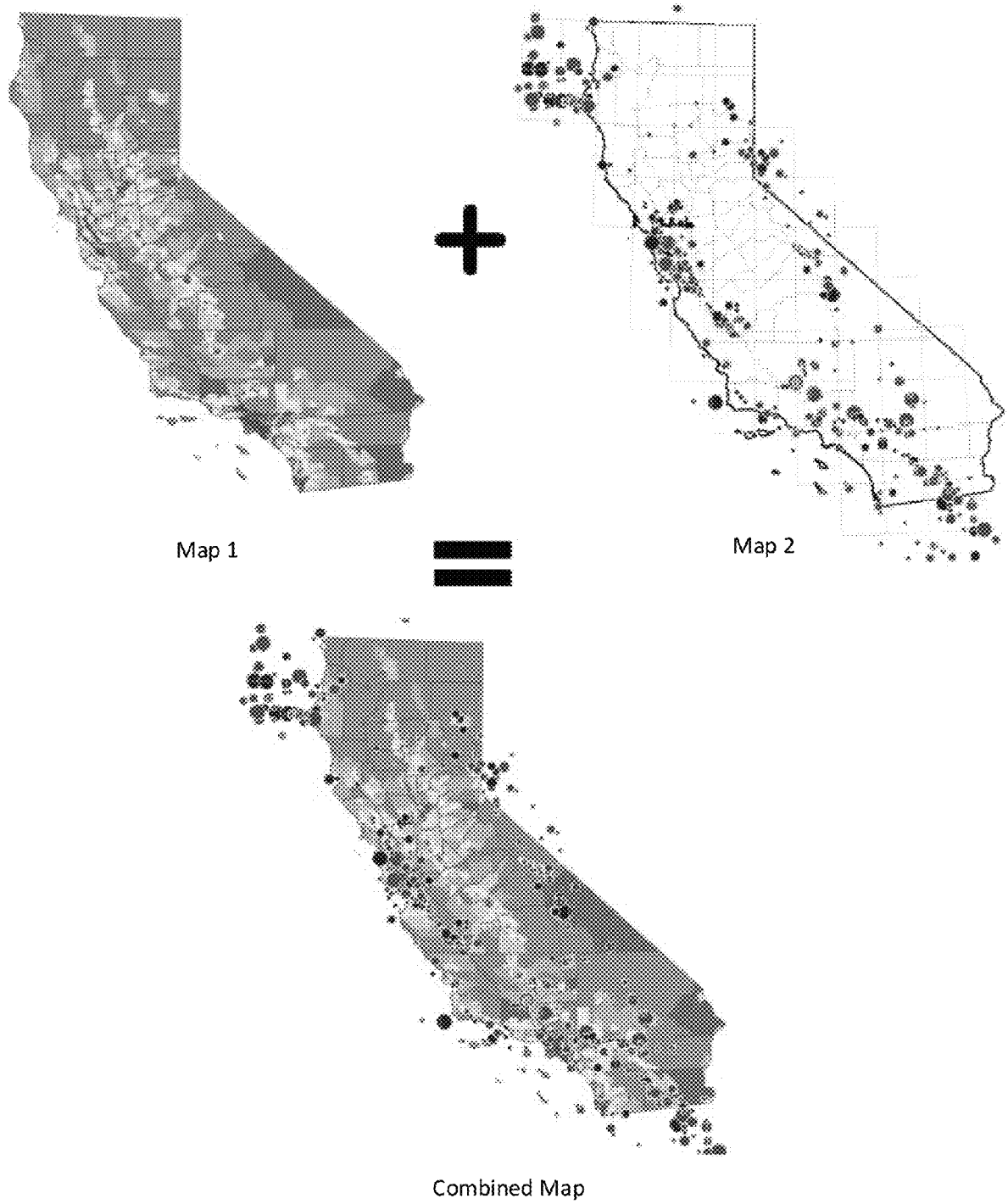
FIG. 15 is a block diagram depicting the combination of two data visualizations according to another example of the invention.

FIG. 15 is a block diagram depicting the combination of two data visualizations according to another example of the invention. FIG. 15 provides an example of merging two maps (Map 1 and Map 2) with different layer types to generate a Combined Map. Map 1 shows population data for California; Map 2 shows historical earthquake data, also for California. Because the boundaries are similar (i.e., California), the layers of Map 1 and Map 2 may be combined to create a single map (the Combined Map) that shows both population and earthquake data.

If data visualizations of two different types are to be combined, the resulting combined data visualization may be of the same type as the target data visualization (for example, the data visualization onto which the other data visualization was dropped). For example, a chart may be dropped onto a map or vice-versa. If the data sets are able to be combined, the resulting data visualization may take on the form of the target data visualization. More specifically, if a chart is dropped onto a map, the resulting visualization may be a map; if a map is dropped onto a chart, the resulting visualization may be a chart. If the data sets are not able to be combined, the chart and map may appear side by side in a unified data visualization, as shown in the lower right-hand corner of FIG. 13.

Legends

A legend is generally a key that indicates what particular colors, symbols, or other visual aspects of a data visualization refer to. Legends can facilitate understanding by the user. The data visualizations to be combined may or may not have legends. The metadata 310 for a data visualization such as the first data visualization 309 may optionally include legend data.

When two data visualizations are merged, legend data of the original data visualizations may be copied to the combined data visualization. Alternatively, new legends for the original data visualizations and/or a combined legend for the combined data visualization may be created.

As an example, when a user combines two charts that show series data on the same axis, the legend items for both charts may be combined into a single legend. As another example, when a user combines two charts that do not include legends (such as two bar charts), a legend in which the legend items are the names of the individual charts may be created automatically.

Figure 16:
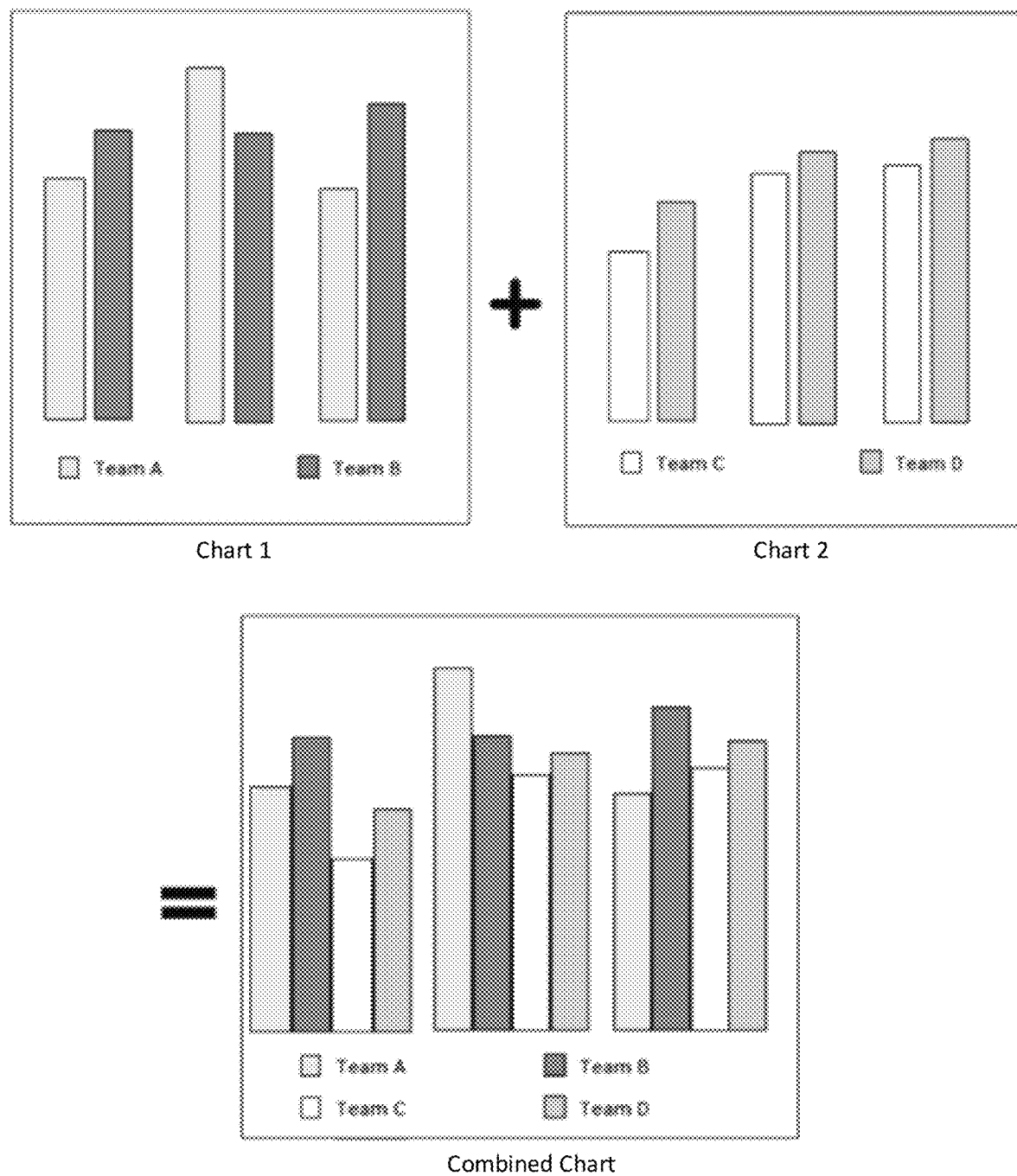
FIG. 16 is a block diagram depicting the combination of two data visualizations according to another example of the invention.

FIG. 16 is a block diagram depicting the combination of two data visualizations according to another example of the invention. FIG. 16 provides an example of merging two charts (Chart 1 and Chart 2) that both show series data on the x-axis. In the resulting Combined Chart, the legend items for both Chart 1 and Chart 2 may appear in the same legend.

FIG. 17 is a block diagram depicting the combination of two data visualizations according to another example of the invention. FIG. 17 provides an example of merging a line chart (Chart 1) and a bar chart (Chart 2), neither of which has a legend. In the resulting Combined Chart, a new legend may automatically be created in which the data of Chart 1 and Chart 2 are represented using the names of the original charts.

Combination of More than Two Data Visualizations

The present invention is not limited to combination of two data visualizations. In certain embodiments, the system 400 may combine three or more data visualizations to generate a combined data visualization that presents the data from all three or more data visualizations.

The user 100 may make a selection to carry out such a combination in any of a wide variety of ways. For example, the user 100 may hold down control and/or shift while clicking one or more additional data sets, and then drag the entire selection onto a target data set to be combined with them. Alternatively, the user 100 may select more than two data sets to combine from a menu, text input, speech input, or other input mechanism. As another alternative, the user 100 may perform the combination in steps, by clicking and dragging one data visualization onto another, and then clicking and dragging a third data visualization onto the resulting combined data visualization to initiate generation of another combined data visualization that also presents data from the third data visualization.

Where the user has selected three or more data visualizations for combination, the system 400 may carry such a combination, for example, by applying the foregoing principles to combine two of the data visualizations, and then combining each additional data visualization to the previously-generated combined data visualization until all of the original data visualizations have been included. Alternatively, the system 400 may be designed to simultaneously combine three or more data visualizations to generate the desired combined data visualization.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics of the invention.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment of the invention. The appearances of the phrases "in one embodiment" or "in at least one embodiment" in various places in the specification are not necessarily all referring to the same embodiment.

In various embodiments, the present invention can be implemented as a system or a method for performing the above-described techniques, either singly or in any combination. In another embodiment, the present invention can be implemented as a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the invention include: a mobile phone, personal digital assistant, smartphone, kiosk, server computer, enterprise computing device, desktop computer, laptop computer, tablet computer, consumer electronic device, or the like. An electronic device for implementing the present invention may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for generating a composite data visualization, the method comprising:
   at a display device, presenting a data visualization graphical user interface including a source data visualization and a target data visualization, the source data visualization being displayed separately from the target data visualization in the data visualization graphical user interface, the source data visualization comprising layer metadata, and the target data visualization comprising boundary metadata and layer metadata, the boundary metadata defining a visual boundary of the target data visualization;
   at a processor, receiving a request to combine the source data visualization and the target data visualization; and
   at the processor, generating for display to a user, a composite data visualization based on the layer metadata associated with the source data visualization, and the boundary metadata and the layer meta data associated with the target data visualization, the layer metadata of the source data visualization being displayed within parameters of the boundary metadata of the target data visualization.

2. The computer-implemented method of claim 1, wherein the layer metadata further comprises:
   property values of a plurality of visual descriptors that visually describe aspects of the source data visualization and the target data visualization, the plurality of visual descriptors having a specific geometric orientation on each layer of the source data visualization and the target data visualization.

3. The computer-implemented method of claim 2, wherein the property values comprise color parameters and quantitative parameters.

4. The computer-implemented method of claim 3, wherein generating for display to the user, the composite data visualization further comprises:
   determining, at the processor, a combined boundary for the composite data visualization using the boundary metadata associated with the target data visualization describing a geometric boundary associated with the target data visualization, wherein the composite data visualization has the combined boundary and the specific geometric orientation of the plurality of visual descriptors associated with the target data visualization are preserved in the composite data visualization.

5. The computer-implemented method of claim 4, wherein generating for display to the user, the composite data visualization further comprises:
   determining, at the processor, new geometric locations for the plurality of visual descriptors based on the layer metadata associated with the source data visualization and the layer metadata associated with the target data visualization; and dynamically orienting on the composite data visualization the plurality of visual descriptors associated with the source data visualization based on the new geometric locations.

6. The computer-implemented method of claim 1, wherein the source data visualization and the target data visualization have different layer types.

7. The computer-implemented method of claim 6, wherein the composite data visualization has composite boundary metadata that is one of similar to and the same as the boundary metadata associated with the target data visualization.

8. The computer-implemented method of claim 1, wherein the source data visualization depicts a first data set and the target data visualization depicts a second data set, the first data set having a first attribute and the second data set having a second attribute, the first attribute and the second attribute being distinct.

9. The computer-implemented method of claim 8, wherein the first attribute comprises quantitative data describing a first sample and the second attribute comprises quantitative data describing a second sample.

10. The computer-implemented method of claim 8, wherein the first attribute comprises qualitative data describing a first sample and the second attribute comprises qualitative data describing a second sample.

11. The method of claim 1, wherein the boundary metadata comprises one or more of area names, boundary location points, and map projection types.

12. A system for automatically generating a composite data visualization, comprising:
    a display device that presents a data visualization graphical user interface including a source data visualization and a target data visualization, the source data visualization being displayed separately from the target data visualization in the data visualization graphical user interface, the source data visualization comprising layer metadata, and the target data visualization comprising boundary metadata and layer metadata, the boundary metadata defining a visual boundary of the target data visualization; and
    a processor coupled to the display device and that performs operations comprising:
        receiving a request to combine the source data visualization and the target data visualization; and
        generating for display to a user, a composite data visualization based on the layer metadata associated with the source data visualization, and boundary metadata and layer meta data associated with the target data visualization, the layer metadata of the source data visualization being displayed within parameters of the boundary metadata of the target data visualization.

13. The system of claim 12, wherein the layer metadata further comprises:
    property values of a plurality of visual descriptors that visually describe aspects of the source data visualization and the target data visualization, the plurality of visual descriptors having a specific geometric orientation on each layer of the source data visualization and the target data visualization.

14. The system of claim 13, wherein generating for display to the user, the composite data visualization further comprises:

determining a combined boundary for the composite data visualization using the boundary metadata associated with the target data visualization describing a geometric boundary associated with the target data visualization, wherein the composite data visualization has the combined boundary and the specific geometric orientation of the plurality of visual descriptors associated with the target data visualization are preserved in the composite data visualization.

15. The system of claim 14, wherein generating for display to the user, the composite data visualization further comprises:
    determining new geometric locations for the plurality of visual descriptors based on the layer metadata associated with the source data visualization and the layer metadata associated with the target data visualization; and
    dynamically orienting on the composite data visualization the plurality of visual descriptors associated with the source data visualization based on the new geometric locations.

16. The system of claim 12, wherein the source data visualization and the target data visualization have different layer types.

17. The system of claim 12, wherein the composite data visualization has composite boundary metadata that is one of similar to and the same as the boundary metadata associated with the target data visualization.

18. The system of claim 12, wherein the source data visualization depicts a first data set and the target data visualization depicts a second data set, the first data set having a first attribute and the second data set having a second attribute, the first attribute and the second attribute being distinct.

19. The system of claim 18, wherein the first attribute comprises quantitative data describing a first sample and the second attribute comprises quantitative data describing a second sample.

20. The system of claim 18, wherein the first attribute comprises qualitative data describing a first sample and the second attribute comprises qualitative data describing a second sample.

21. A computer-implemented method comprising:
    at a display device, presenting a data visualization graphical user interface including a source data visualization and a target data visualization, the source data visualization being displayed separately from the target data visualization in the data visualization graphical user interface, the source data visualization comprising source boundary metadata and source layer metadata, and the target data visualization comprising target boundary metadata and target layer metadata, the target boundary metadata defining a visual boundary of the target data visualization;
    at a processor, determining that the source boundary metadata and the target boundary metadata are sufficiently similar to be combined by comparing geometric layouts described in the source boundary metadata and the target boundary metadata;
    at the processor, receiving a request to combine the source data visualization and the target data visualization;
    at the processor, identifying geometric locations of visual descriptors within the source layer metadata;
    at the processor, generating a composite data visualization based on the source boundary metadata and the target boundary metadata, the composite data visualization including the visual descriptors associated with the source layer metadata, the visual descriptors being displayed within parameters of the target boundary metadata; and at the display device, presenting within the data visualization graphical user interface the composite data visualization.

* * * * *